United States Patent
Cho et al.

(10) Patent No.: US 11,729,725 B2
(45) Date of Patent: *Aug. 15, 2023

(54) ELECTRONIC DEVICE FOR SUPPORTING DUAL CONNECTIVITY AND POWER CONTROL METHOD THEREFOR

(71) Applicant: Samsung Electronics Co., Ltd., Suwon-si (KR)

(72) Inventors: Namjun Cho, Suwon-si (KR); Jooseung Kim, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,648

(22) Filed: Nov. 23, 2021

(65) Prior Publication Data

US 2022/0086766 A1 Mar. 17, 2022

Related U.S. Application Data

(63) Continuation of application No. 16/923,693, filed on Jul. 8, 2020, now Pat. No. 11,206,616.

(30) Foreign Application Priority Data

Jul. 9, 2019 (KR) .......................... 10-2019-0082794

(51) Int. Cl.
*H04W 76/16* (2018.01)
*H04W 52/14* (2009.01)
(Continued)

(52) U.S. Cl.
CPC ......... *H04W 52/146* (2013.01); *H04W 52/08* (2013.01); *H04W 52/243* (2013.01);
(Continued)

(58) Field of Classification Search
CPC ... H04W 52/146; H04W 76/16; H04W 52/08; H04W 52/243; H04W 52/346; H04W 88/06
See application file for complete search history.

(56) References Cited

U.S. PATENT DOCUMENTS

2008/0261534 A1   10/2008   Wang et al.
2011/0053523 A1   3/2011    Yeh et al.
(Continued)

FOREIGN PATENT DOCUMENTS

EP          3 337 044 A1     6/2018

OTHER PUBLICATIONS

Catt; UL Power Control for NR DC; 3GPP TSG RAN WG1 Meeting #96; R1-1901986; Feb. 25-Mar. 1, 2019; Athens, Greece.
(Continued)

*Primary Examiner* — John J Lee
(74) *Attorney, Agent, or Firm* — Jefferson IP Law, LLP

(57) ABSTRACT

An electronic device including a housing, at least one antenna disposed inside the housing or disposed on at least a part of the housing, a first transceiver configured to generate a first signal corresponding to a first communication network and transmit the first signal to the at least one antenna, a second transceiver configured to generate a second signal corresponding to a second communication network and transmit the second signal to the at least one antenna, a first coupler electrically connected between the at least one antenna and the first transceiver, a first communication processor operatively connected to the first transceiver, and a second communication processor operatively connected to the second transceiver, wherein the second communication processor is configured to control a transmission power of the second signal, at least partially based on a signal received via feedback by the first coupler.

20 Claims, 19 Drawing Sheets

(51) Int. Cl.
    *H04W 52/08*     (2009.01)
    *H04W 52/24*     (2009.01)
    *H04W 52/34*     (2009.01)
    *H04W 88/06*     (2009.01)

(52) U.S. Cl.
    CPC ......... *H04W 52/346* (2013.01); *H04W 76/16* (2018.02); *H04W 88/06* (2013.01)

(56) References Cited

U.S. PATENT DOCUMENTS

| | | |
|---|---|---|
| 2013/0329665 A1 | 12/2013 | Kadous et al. |
| 2015/0372792 A1 | 12/2015 | Damnjanovic et al. |
| 2016/0087658 A1 | 3/2016 | Weissman et al. |
| 2017/0187404 A1 | 6/2017 | Hahn et al. |
| 2018/0331704 A1* | 11/2018 | Xie .......................... H04B 1/40 |
| 2019/0075552 A1 | 3/2019 | Yu et al. |
| 2019/0159129 A1* | 5/2019 | Choi ..................... H04W 52/42 |
| 2020/0127698 A1* | 4/2020 | Cho .................... H04L 25/0226 |

OTHER PUBLICATIONS

Motorola Mobility et al.; Power control for multi-panel uplink transmission; 3GPP TSG RAN WG1 #96; R1-1902849; Feb. 25-Mar. 1, 2019; Athens, Greece.

International Search Report with Written Opinion dated Sep. 24, 2020; International Appln. No. PCT/KR2020/008886.

European Search Report dated Nov. 12, 2020; European Appln. No. 20184782.9-1212.

\* cited by examiner

ELECTRONIC DEVICE FOR SUPPORTING DUAL CONNECTIVITY AND POWER CONTROL METHOD THEREFOR

CROSS-REFERENCE TO RELATED APPLICATION(S)

This application is a continuation application of prior application Ser. No. 16/923,693, filed on Jul. 8, 2020, which is based on and claimed priority under 35 U.S.C. § 119 (a) of a Korean patent application number 10-2019-0082794, filed on Jul. 9, 2019, in the Korean Intellectual Property Office, the disclosure of each of which is incorporated by reference herein in its entirety.

BACKGROUND

1. Field

The disclosure relates to an electronic device. More particularly, the disclosure relates to an electronic device that supports dual connectivity, and a power control method of the electronic device.

2. Description of Related Art

As mobile communication technologies have developed, portable terminals that provide various functions have become popular. Accordingly, an effort to develop a $5^{th}$ generation (5G) communication system is being made in order to meet wireless data traffic demand which is increasing. In order to achieve a high data transmission rate, the 5G communication system considers implementation in a superhigh frequency band, in addition to implementation in a high frequency band which has been used by a $3^{th}$ generation (3G) communication system and a long-term evolution (LTE) communication system, so as to provide a high data transmission speed.

As a method of implementing 5G communication, a standalone (SA) scheme and a non-stand alone (NSA) scheme are considered. The NSA scheme may be a scheme of using a new radio (NR) system together with an existing LTE system. In the NSA scheme, a user equipment (UE) may use a eNB in an LTE system, and a gNB in an NR system. A technology that allows a user terminal to operate in different communication systems is referred to as dual connectivity.

Dual connectivity was suggested first by 3GPP release-12. According to the first suggestion, dual connectivity that uses a 3.5 GHz frequency band as a small cell, in addition to an LTE system, was suggested. It is currently being discussed whether to implement the NSA scheme of 5G by using an LTE system as a master node and an NR system as a secondary node, in the dual connectivity suggested by 3GPP release-12.

An electronic device that supports dual connectivity may perform communication via a heterogeneous communication network, and an electronic device that supports dual connectivity may separately include communication processors for processing signals of respective communication networks. If fast data exchange between the separately included two communication processors is difficult, a transmission power allowed for each electronic device may not be effectively used.

For example, if an electronic device that supports dual connectivity transmits data via two communication networks at the same time, and the electronic device does not know power-related information of the two communication networks, the electronic device may not efficiently utilize the maximum power (Pmax) resource allowed by the power class of the electronic device, but may simply control power depending on a parameter provided from a network. In the situation in which power is controlled by the network, a time delay may be relatively long, and thus, a power resource may not be effectively used, and performance and coverage may deteriorate.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, as aspect of the disclosure is to provide an electronic device that supports dual connectivity, and a power control method of the electronic device. Additional aspects will be set forth in part in the description which follows and, in part, will be apparent from the description, or may be learned by practice of the presented embodiments.

In accordance with an aspect of the disclosure, an electronic device that supports dual connectivity and a power control method of the electronic device is provided. The electronic device is configured to prevent a decrease in reception sensitivity, caused by harmonic or intermodulation distortion (IMD) of transmission power, or prevent a spurious emission failure, even though dynamic power sharing (DPS) between two communication networks is difficult.

In accordance with another aspect of the disclosure, an electronic device that supports dual connectivity and a power control method of the electronic device is provided. The electronic device is configured to optimize or minimize additional maximum power reduction (AMPR), or effectively distribute a given uplink power resource in dual connectivity environment.

In accordance with another aspect of the disclosure, an electronic device is provided. The electronic device includes a housing, at least one antenna disposed inside the housing or disposed on at least a part of the housing, a first transceiver configured to generate a first signal corresponding to a first communication network and to transmit the first signal to the at least one antenna, a second transceiver configured to generate a second signal corresponding to a second communication network and to transmit the second signal to the at least one antenna, a first coupler electrically connected between the at least one antenna and the first transceiver, a first communication processor operatively connected to the first transceiver, and a second communication processor operatively connected to the second transceiver, wherein the second communication processor is configured to control a transmission power of the second signal, at least partially based on a signal received via feedback by the first coupler.

In accordance with another aspect of the disclosure, a power control method of an electronic device that supports dual connectivity is provided. The power control method includes transmitting at least a part of a first signal, which is received from a first transceiver and corresponds to a first communication network, to a first antenna by a first coupler electrically connected between the first antenna and the first transceiver, transmitting at least a part of a second signal, which is received from a second transceiver and corresponds to a second communication network, to a second antenna by a second coupler electrically connected between the second antenna and the second transceiver, receiving, by a second communication processor, a signal fed back from the first coupler, and controlling, by the second communication processor, a transmission power of the second signal, at least partially based on the signal fed back from the first coupler.

In accordance with another aspect of the disclosure, an electronic device is provided. The electronic device includes a housing, at least one antenna disposed inside the housing, or disposed on at least a part of the housing, a first transceiver configured to generate a first signal corresponding to a first communication network and to transmit the first signal to the at least one antenna, a second transceiver configured to generate a second signal corresponding to a second communication network and to transmit the second signal to the at least one antenna, a first coupler electrically connected between the at least one antenna and the first transceiver and configured to transmit at least a part of the first signal received from the first transceiver to the at least one antenna, and at least one communication processor operatively connected with the first transceiver or the second transceiver, wherein the at least one communication processor is configured to control a transmission power of the second signal, at least partially based on a signal received via feedback by the first coupler.

In accordance with another aspect of the disclosure, even in a dual connectivity structure in which dynamic power sharing is difficult, real-time uplink power distribution, which is appropriate for the class of each UE, may be performed.

In accordance with another aspect of the disclosure, an electronic device that provides dual connectivity is provided. The electronic device has a maximum power reduction (MPR) condition which can enlarge coverage of a transmission signal, in addition to preventing a decrease in reception sensitivity, caused by harmonic or intermodulation distortion of transmission power, or preventing a spurious emission failure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
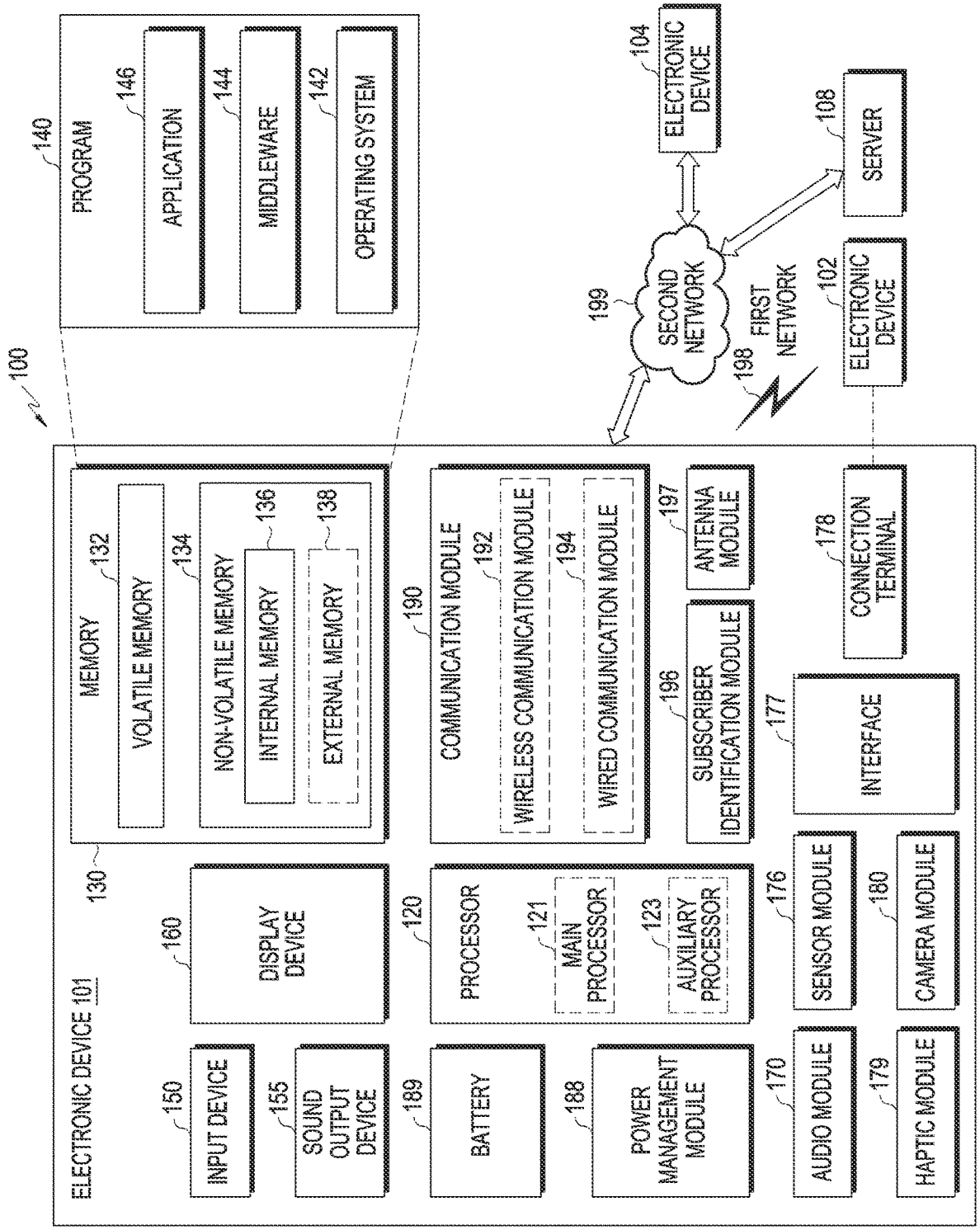
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit in the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, a singular expression used herein may include a plural expression unless they are definitely different in the context. As used herein, the expression "comprises," "include," or the like should not be interpreted to necessarily include all elements or all operations described in the specification, and should be interpreted to be allowed to exclude some of them or further include additional elements or operations.

The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposer between them. In contrast, it should be understood that when an element is referred to as being "directly connected" or "directly coupled" to another element, there are no element interposed between them.

Hereinafter, embodiments of the disclosure will be described in detail with reference to the accompanying drawings. Regardless of drawing signs, the same or like elements are provided with the same reference numeral, and a repeated description thereof will be omitted. In describing the disclosure, descriptions related to technical contents well-known in the art and not associated directly with the disclosure will be omitted. Further, it should be noted that the accompanying drawings are presented merely to help easy understanding of the disclosure, and are not intended to limit the disclosure. The technical idea of the disclosure should be construed to cover all changes, equivalents, and alternatives, in addition to the drawings.

In the following, a mobile station will be described in the drawings, but the mobile station may be called an electronic device, a terminal, a mobile equipment (ME), a user equipment (UE), a user terminal (UT), a subscriber station (SS), a wireless device, a handheld device, an access terminal (AT). Further, the mobile station may be a device having a communication function, such as a mobile phone, a personal digital assistant (PDA), a smartphone, a wireless modem, or a notebook.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include at least one processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and/or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) and/or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
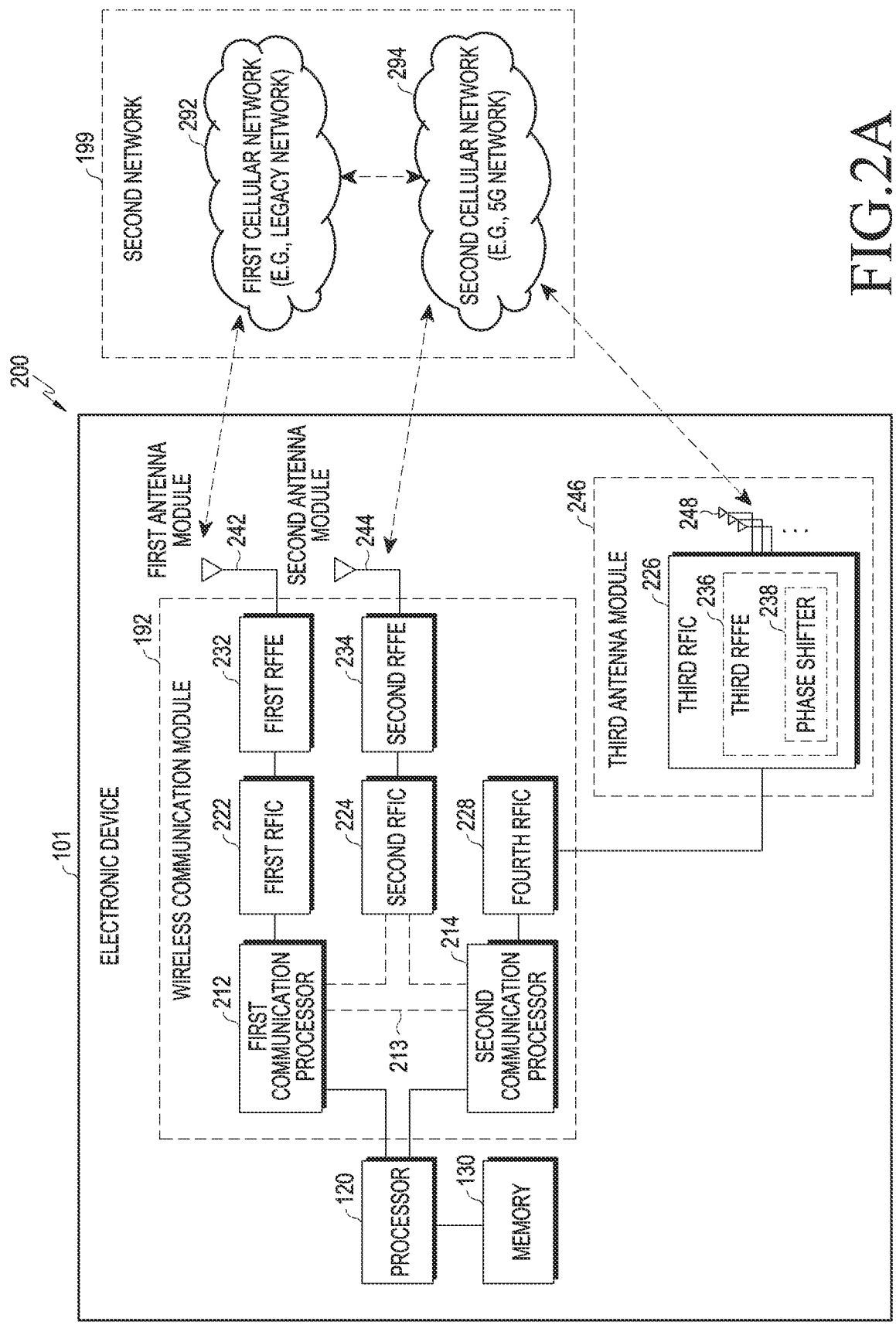
FIG. 2A is a block diagram of an electronic device for supporting legacy network communication and 5G network communication according to an embodiment of the disclosure.
Figure 2B:
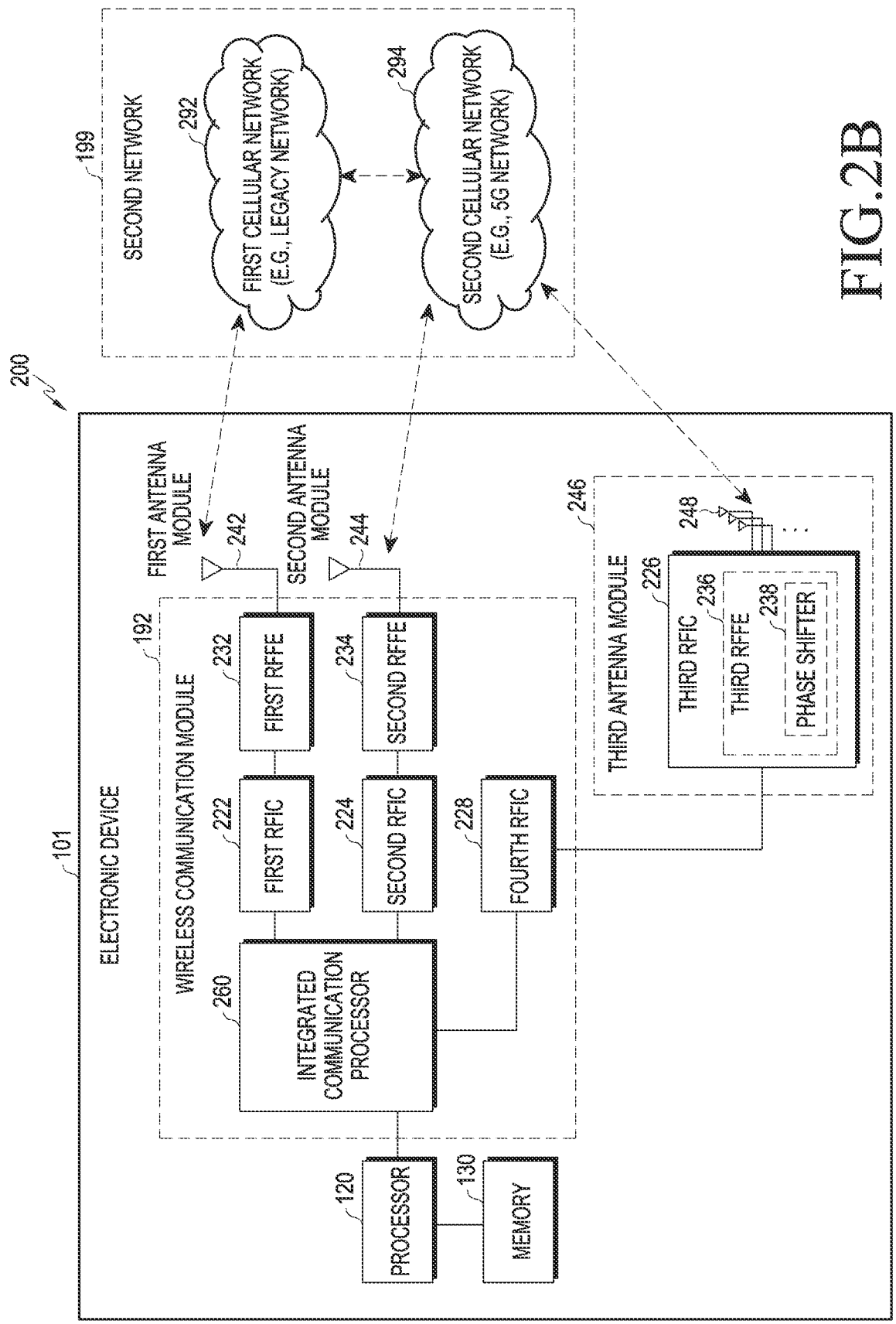
FIG. 2B is another block diagram of an electronic device for supporting legacy network communication and 5G network communication according to an embodiment of the disclosure.

FIGS. 2A and 2B are block diagrams of electronic devices for supporting legacy network communication and 5G network communication according to an embodiment of the disclosure.

Referring to FIGS. 2A and 2B, the electronic device 101 of block diagram 200 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294.

According to another embodiment, the electronic device 101 may further include at least one component among the components illustrated in FIG. 1, and the second network 199 may further include at least one other cellular network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, a fourth RFIC 228 may be omitted or may be included as a part of the third RFIC 226.

The first communication processor 212 may establish a communication channel of a band to be used for wireless communication with the first cellular network 292, and may support legacy network communication via the established communication channel. According to various embodiments, the first cellular network 292 may be a legacy network including a 2G, 3G, 4G, or long-term evolution (LTE) network. The second communication processor 214 may establish a communication channel corresponding to a designated band (e.g., approximately 6 GHz to 60 GHz) among bands to be used for wireless communication with the second cellular network 294, and may support 5G network communication via the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., approximately 6 GHz or less) among bands to be used for wireless communication with the second cellular network 294, and may support 5G network communication via the established communication channel.

The first communication processor 212 may perform data transmission or reception with the second communication processor 214. For example, data classified to be transmitted via the second cellular network 294 may be changed to be transmitted via the first cellular network 292. In this instance, the first communication processor 212 may receive transmission data from the second communication processor 214. For example, the first communication processor 212 may perform data transmission or reception with the second communication processor 214, via a universal asynchronous receiver/transmitter (UART) (e.g., a high speed-UART (HS-UART)) or a peripheral component interconnect bus express (PCIe) interface 213. The first communication processor 212 may perform, with the second communication processor 214, transmission or reception of various information such as sensing information, information associated with an output strength, resource block (RB) allocation information, and the like.

Depending on the implementation, the first communication processor 212 may not be directly connected to the second communication processor 214. In this instance, the first communication processor 212 may perform data transmission or reception with the second communication processor 214, via the processor 120 (e.g., an application processor). According to various embodiments, the first communication processor 212 or the second communication processor 214 may perform data transmission or reception with the processor 120 via a shared memory or a PCIe interface.

According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the auxiliary processor 123, or the communication module 190. For example, as illustrated in FIG. 2B, an integrated communication processor 260 may support both a function for communicating with the first cellular network and a function for communicating with the second cellular network.

In the case of transmission, the first RFIC 222 may convert a baseband signal generated by the first communication processor 212 into a radio frequency (RF) signal in the range of approximately 700 MHz to 3 GHz used for the first cellular network 292 (e.g., a legacy network). In the case of reception, an RF signal is obtained from the first cellular network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of an Sub6 band (e.g., approximately 6 GHz or less) used for the second cellular network 294 (e.g., a 5G network). In the case of reception, an 5G Sub6 RF signal is obtained from the second cellular network 294 (e.g., a 5G network) via an antenna (e.g., the second antenna module 244), and may be preprocessed via an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second cellular network 294 (e.g., 5G network). In the case of reception, a 5G Above6 RF signal is obtained from the second cellular network 294 (e.g., a 5G network) via an antenna (e.g., the antenna 248), and may be preprocessed via a third RFFE 236. The third RFIC 226 may convert the preprocessed 5G Above6 RF signal into a baseband signal so that the baseband signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second cellular network 294 (e.g., a 5G network) via an antenna (e.g., the antenna 248), and may be converted into an IF signal by the third RFIC 226. The fourth RFIC 228 may convert the IF signal into a baseband signal so that the baseband signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of a single package. According to an embodiment, at least one antenna module of the first antenna module 242 or the second antenna module 244 may be omitted, or may be combined with another antenna module, so as to process RF signals in a plurality of bands.

According to an embodiment, the third RFIC 226 and the antenna 248 may be disposed on the same substrate, and may form a third antenna module 246. For example, the wireless communication module 192 or the processor 120 may be disposed on a first substrate (e.g., a main PCB). In this instance, the third RFIC 226 is disposed on a part (e.g., a lower part) of the second substrate (e.g., a sub PCB) different from the first substrate, and the antenna 248 is disposed on another part (e.g., an upper part), so that the third antenna module 246 may be formed. By disposing the third RFIC 226 and the antenna 248 on the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second cellular network 294 (e.g., a 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second cellular network 294 (e.g., a 5G network) may operate independently (e.g., Stand-Alone (SA)) from the first cellular network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packet core (EPC)) of the legacy network. Protocol information (e.g., LTE protocol information) for communication with the legacy network or protocol information (e.g., New Radio (NR) protocol information) for communication with the 5G network may be stored in the memory 230, and may be accessed by another component (e.g., the processor 120, the first communication processor 212, or the second communication processor 214).

Figure 3:
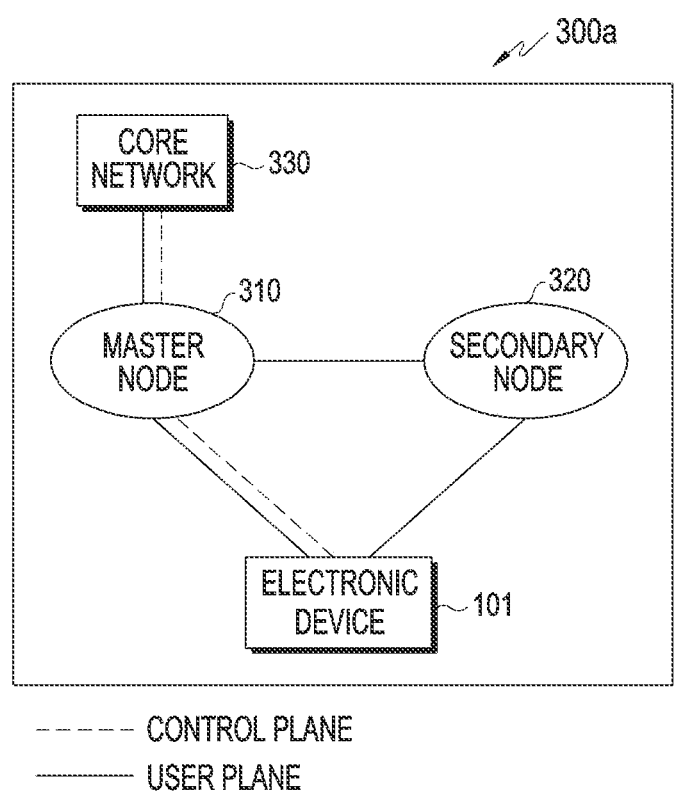
FIG. 3 is a diagram illustrating a wireless communication system that provides a network of legacy communication and/or 5G communication according to an embodiment of the disclosure.

FIG. 3 is a diagram illustrating a wireless communication system that provides a network of legacy communication and/or 5G communication according to an embodiment of the disclosure.

Referring to FIG. 3, a network environment 300a may include at least one of a legacy network and a 5G network. The legacy network, for example, may include a 3GPP standard-based 4G or LTE base station (e.g., eNodeB (eNB)) that supports radio access to the electronic device 101, and an evolved packet core (EPC) that manages 4G communication. The 5G network, for example, may include a new radio (NR) base station (e.g., gNodeB (gNB)) that supports radio access to the electronic device and a $5^{th}$ generation core (5GC) that manages 5G communication of the electronic device 101.

According to various embodiments, the electronic device 101 may transmit or receive a control message and user data via legacy communication and/or 5G communication. The control message, for example, may include a message related to at least one of security control, bearer setup, authentication, registration, or mobility management in association with the electronic device 101. The user data, for example, may refer to user data excluding a control message transmitted or received between the electronic device 101 and a core network 330 (e.g., an EPC).

Referring to FIG. 3, the electronic device 101 according to an embodiment may perform transmission or reception of at least one of a control message or user data with at least a part of the 5G network (e.g., an NR base station or a 5GC), using at least a part of the legacy network (e.g., an LTE base station or an EPC).

According to various embodiments, the network environment 300a may include a network environment that provides a wireless communication dual connectivity (DC) to an LTE base station and an NR base station, and performs transmission or reception of a control message with the electronic device 101 via the core network 330 corresponding to one of the EPC or 5GC.

According to various embodiments, in a DC environment, one of an LTE base station or an NR base station may operate as a master node (MN) 310, and the other may operate as a secondary node (SN) 320. The MN 310 may be connected to the core network 330, and may transmit or receive a control message. The MN 310 and the SN 320 are connected via a network interface, and may perform transmission or reception of a message related to managing of a radio resource (e.g., a communication channel) therebetween.

According to various embodiments, the MN 310 may be implemented as an LTE base station, the SN 320 may be implemented as an NR base station, and the core network 330 may be implemented as an EPC. For example, a control message may be transmitted or received via the LTE base station and the EPC, and user data may be transmitted or received via at least one of the LTE base station or NR base station.

According to various embodiments, the MN 310 may be implemented as an NR base station, the SN 320 may be implemented as an LTE base station, and the core network 330 may be implemented as a 5GC. For example, a control message may be transmitted or received via the NR base station and the 5GC, and user data may be transmitted or received via at least one of the LTE base station or NR base station.

According to various embodiments, the electronic device 101 may be registered with at least one of the EPC or 5GC, and may transmit or receive a control message.

According to various embodiments, the EPC or 5GC may interwork so as to manage communication of the electronic device 101. For example, the movement information of the electronic device 101 may be transmitted or received via an interface between the EPC and the 5GC.

As described above, dual connectivity via an LTE base station and an NR base station may be referred to as an E-UTRA new radio dual connectivity (EN-DC).

Figure 4:
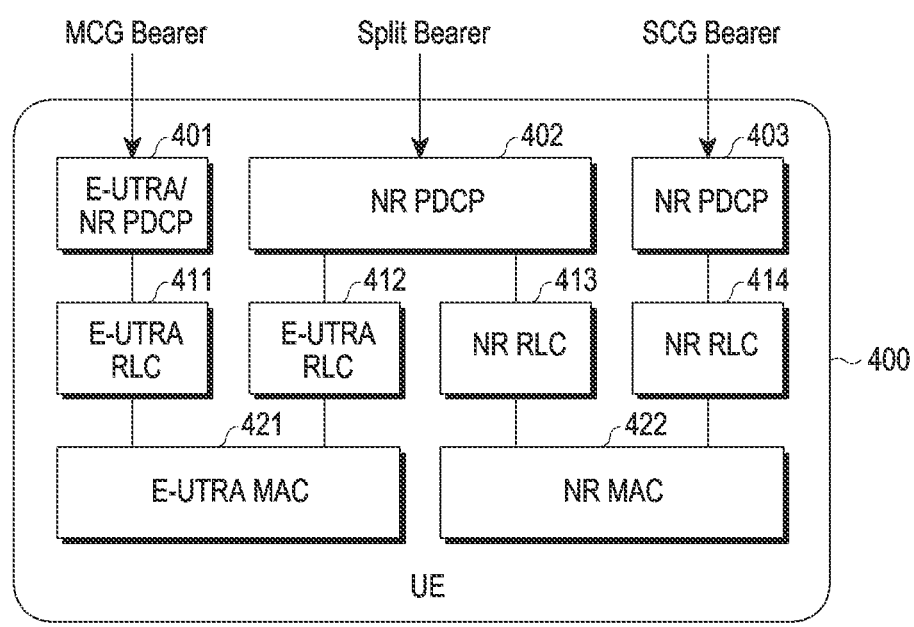
FIG. 4 is a diagram illustrating a bearer in a UE according to an embodiment of the disclosure.

FIG. 4 is a diagram illustrating a bearer in a user equipment (UE) according to an embodiment of the disclosure.

Referring to FIG. 4, a bearer available in the 5G non-standalone network environment (e.g., the network environment 300a of FIG. 3) may include a master cell group (MCG) bearer, a secondary cell group (SCG) bearer, and a split bearer. A user equipment (UE) 400 may be configured with an E-UTRA/NR packet data convergence protocol (E-UTRA/NR PDCP) entity 401 and NR PDCP entities 402 and 403. The UE 400 may be configured with E-UTRA radio link control (E-UTRA RLC) entities 411 and 412, and NR RLC entities 413 and 414. The UE 400 may be configured with an E-UTRA MAC entity 421 and an NR MAC entity 422. The UE may be a user equipment that is capable of performing communication with a base station, and may be interchangeably used with the electronic device 101 of FIG. 1. For example, in various embodiments, the fact that a UE performs a predetermined operation may refer to the fact that at least one element included in the electronic device 101 performs the predetermined operation.

An MCG, for example, may correspond to a main node (MN) 310 of FIG. 3, and an SCG, for example, may correspond to a secondary node (SN) 320 of FIG. 3. If a node is determined for communication, the UE 400 may configure various entities illustrated in FIG. 4 for communication with the determined node (e.g., a base station). The entities 401, 402, and 403 in a PDCP layer may receive data (e.g., a PDCP SDU corresponding to an IP packet), and may output converted data (e.g., a PDCP protocol data unit (PDU)) to which additional information (e.g., header information) is applied. The entities 411, 412, 413, and 414 in an RLC layer may receive the converted data (e.g., the PDCP PDU) output from the entities 401, 402, and 403 in the PDCP layer, and may output converted data (e.g., an RLC PDU) to which additional information (e.g., header information) is applied. The entities 421 and 422 in a MAC layer may receive the converted data (e.g., the RLC PDU) output from the entities 411, 412, 413, and 414 in the RLC layer, may output converted data (e.g., a MAC PDU) to which additional information (e.g., header information) is applied, and may transfer the same to a physical layer (not illustrated).

The MCG bearer may be associated with a path (or data) via which data is transmitted or received using only an entity or resource corresponding to an MN, in DC. The SCG bearer may be associated with a path (or data) via which data is transmitted or received using only a resource or entity corresponding to an SN, in DC. The split bearer may be associated with a path (or data) via which data is transmitted or received using a resource or entity corresponding to a MN or a resource or entity corresponding to an SN, in DC. Accordingly, as illustrated in FIG. 4, the split bearer may be associated with all of the E-UTRA RLC entity 412 and the NR RLC entity 413, and the E-UTRA MAC entity 421 and the NR MAC entity 422, via the NR PDCP entity 402.

Figure 5:
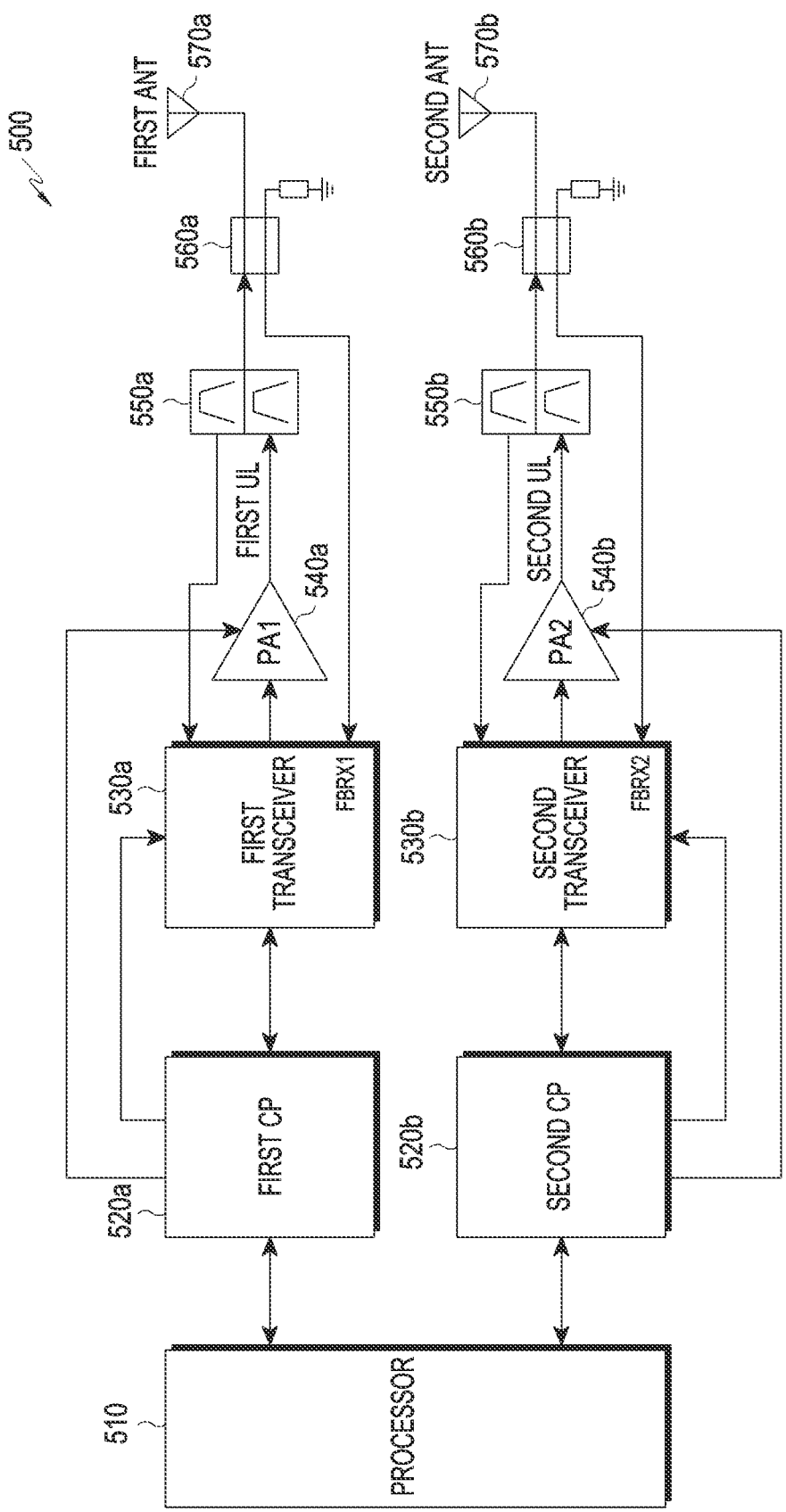
FIG. 5 is a block diagram of an electronic device that provides dual connectivity according to an embodiment of the disclosure.

FIG. 5 is a block diagram of an electronic device that provides dual connectivity according to an embodiment of the disclosure.

Referring to FIG. 5, an electronic device 500 according to various embodiments may include at least one processor 510 (e.g., an application processor), a first communication processor 520a (e.g., a first communication processor (CP)), a second communication processor 520b (e.g., a second CP), a first transceiver 530a, a second transceiver 530b, a first power amplifier 540a, a second power amplifier 540b, a first duplexer 550a, a second duplexer 550b, a first coupler 560a, a second coupler 560b, a first antenna 570a, and/or a second antenna 570b. The electronic device 500 of FIG. 5 may be similar to, or the same as, the electronic device 101 of FIG. 1, FIG. 2A, or FIG. 2B.

The processor 510 may include a controller (or a control circuitry) and a shared memory (e.g., a memory shared by the first communication processor 520a and the second communication processor 520b).

The first communication processor 520a may establish a communication channel of a band to be used for wireless communication with a first communication network, and may support network communication via the established communication channel. According to various embodiments, the first network may include a 2G, 3G, 4G, or long-term evolution (LTE) network. The second communication processor 520b may establish a communication channel corresponding to a designated band (e.g., approximately 6 GHz to 60 GHz) among bands to be used for wireless communication with a second communication network, and may support 5G network communication via the established communication channel. According to various embodiments, the second communication network may be a 5G network defined in 3GPP. According to an embodiment, the first communication processor 520a or the second communication processor 520b may establish a communication channel corresponding to another designated band (e.g., approximately 6 GHz or less) among bands to be used for wireless communication with the second communication network, and may support 5G network communication via the established communication channel.

The first communication processor 520a may perform data transmission or reception with the second communication processor 520b. For example, the first communication processor 520a may perform data transmission or reception with the second communication processor 520b via a UART or a PCIe interface. According to various embodiments, the first communication processor 520a may perform, with the second communication processor 520b, transmission or reception of at least one piece of information among activated band information, channel allocation information, communication state information (idle, sleep, active) associated with the state of communication with a network, sensing information, information associated with an output strength, or resource block (RB) allocation information.

According to an embodiment, the first communication processor 520a may not be directly connected to the second communication processor 520b. In this instance, the first communication processor 520a may perform data transmission or reception with the second communication processor 520b, via the processor 510 (e.g., an application processor).

According to an embodiment, the first communication processor 520a and the second communication processor 520b may be implemented in a single chip or a single package. According to various embodiments, the first communication processor 520a or the second communication processor 520b may be implemented in a single chip or a single package, together with the processor 120, the auxiliary processor 123, or the communication module 190. For example, as illustrated in FIG. 2B, the integrated communication processor 260 may support both a function for communicating with the first communication network and a function for communicating with the second communication network.

According to various embodiments, the first transceiver 530a and/or the second transceiver 530b may receive a frequency signal from a temperature-compensated crystal oscillator (TCXO) and may output a first signal (TX1 or a first UL) and a second signal (TX2 or a second UL), respectively. The first transceiver 530a may combine a PLL_1 signal and a signal transmitted from the first communication processor 520a using a mixer, and may output a radio frequency (RF) signal which is appropriate for the frequency of the first communication network. The second transceiver 530b may combine a PLL_2 signal and a signal transmitted from the second communication processor 520b using a mixer, and may output a radio frequency (RF) signal which is appropriate for the frequency of the second communication network. According to various embodiments, the first signal may refer to a signal on a transmission path which is output from the first transceiver 530a and is transmitted via the first antenna 570a. The second signal may refer to a signal on a transmission path which is output from the second transceiver 530b and is transmitted via the second antenna 570b. The first signal and the second signal may be equivalently applied to the descriptions of FIGS. 7 to 18.

According to various embodiments, the first power amplifier 540a may include an amplifier that is connected to the first transceiver 530a, amplifies an RF signal, decreases distortion of an output signal, or maintains a high-efficiency characteristic. The second power amplifier 540b may include an amplifier that is connected to the second transceiver 530b, amplifies an RF signal, decreases distortion of an output signal, or maintains a high-efficiency characteristic.

According to various embodiments, the first duplexer 550a may receive a first signal from the first power amplifier 540a and may transmit the first signal to the first antenna 570a, and may receive a downlink signal received via the first antenna 570a and may transmit the downlink signal to the first transceiver 530a. The second duplexer 550b may receive a second signal from the second power amplifier 540b and may transmit the second signal to the second antenna 570b, and may receive a downlink signal received via the second antenna 570b and may transmit the downlink signal to the second transceiver 530b.

According to various embodiments, the first power amplifier 540a may amplify the first signal (TX1) received from the first transceiver 530a to a designated gain according to the control of the first communication processor 520a, and may transmit the same to the first antenna 570a via the first coupler 560a. The second power amplifier 540b may amplify the second signal (TX2) received from the second transceiver 530b to a designated gain according to the control of the second communication processor 520b, and may transmit the same to the second antenna 570b via the second coupler 560b.

According to various embodiments, at least a part of the first signal transmitted via the first coupler 560a may be fed back and transmitted to the first transceiver 530a. At least a part of the second signal transmitted via the second coupler 560b may be fed back, and may be provided to the second transceiver 530b.

According to various embodiments, the first transceiver 530a and/or the second transceiver 530b may receive a transmission feedback signal which is fed back from the first coupler 560a and/or second coupler 560b, and may change a frequency using an internal local oscillator (LO) so as to process the same to be a baseband signal. According to various embodiments, the first transceiver 530a and the second transceiver 530b may convert the baseband signal corresponding to transmission power into a digital signal using an analog to digital converter (ADC), and may transmit the digital signal to the first communication processor 520a or the second communication processor 520b. The coupler 560a and 560b may decrease a signal amplified by the power amplifier 540a and 540b connected thereto, to be a relatively small signal and may perform feedback, so that the first transceiver 530a and the second transceiver 530b are capable of processing the signal.

According to various embodiments, the first communication processor 520a may control the gain of the first signal transmitted via the first transceiver 530a, and may control the bias of the first power amplifier 540a, according to a control signal. The second communication processor 520b may control the gain of the second signal transmitted via the second transceiver 530b, and may control the bias of the second power amplifier 540b, according to a control signal.

According to various embodiments, in an electronic device that provides dual connectivity illustrated in FIG. 5, the transceiver 530a and 530b may convert a sensing signal input via an FBRX port (FBRX1 and FBRX2) into a baseband signal, may enable the signal to go through an analog/digital converter (ADC), and may transmit the digitalized sensing signal to the communication processor 520a and 520b connected thereto. The communication processor 520a and 520b may monitor resource block (RB) allocation information and the magnitude of power of a signal that the power amplifier 540a and 540b currently outputs, using the sensing information transferred from the transceiver 530a and 530b, and may control a transmitted signal to be appropriate according to a communication situation.

According to various embodiments, the communication processors 520a and 520b may exchange information via the processor 510, and communication information (e.g., an activated band or channel), which is relatively less variable, may be shared.

According to various embodiments, a signal fed back from the first coupler 560a is transmitted to the second transceiver 530b or the second communication processor 520b, and may be used for controlling the transmission power of a second signal. According to various embodiments, a signal fed back from the second coupler 560b is transmitted to the first transceiver 530a or the first communication processor 520a, and may be used for controlling the transmission power of a first signal. Various embodiments related thereto will be described with reference to FIGS. 7 to 18.

Figure 6:
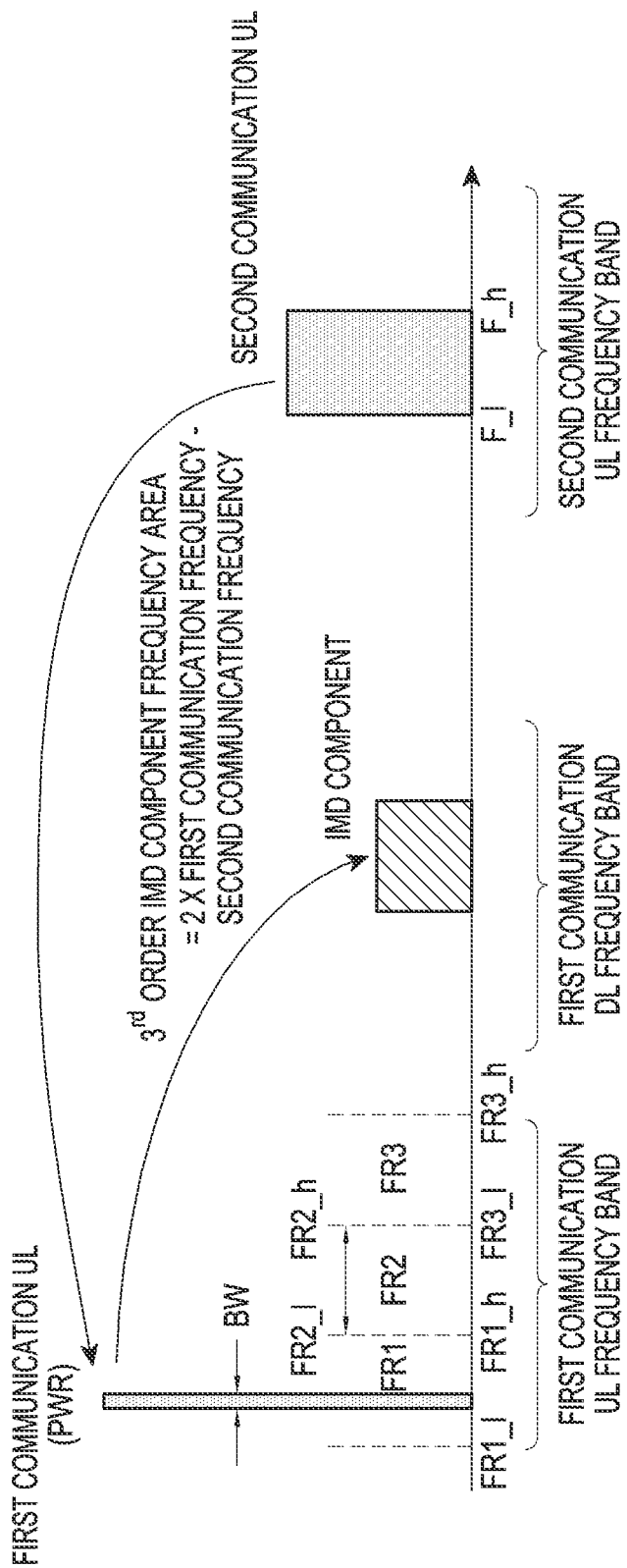
FIG. 6 is a diagram illustrating IMD incurred in an electronic device that provides dual connectivity according to an embodiment of the disclosure.

FIG. 6 is a diagram illustrating IMD incurred in an electronic device that provides dual connectivity according to an embodiment of the disclosure.

Referring to FIG. 6, a first communication uplink (UL) frequency band and a second communication uplink (UL) frequency band may be arranged as illustrated in the drawing. According to an embodiment, the first communication (e.g., LTE communication) uplink frequency band may include an FR1, FR2, or FR3 band. The FR1 band has the frequency range of FR1_1 to FR1_h. The FR2 band has the frequency range of FR2_1 to FR2_h. The FR3 band has the frequency range of FR3_1 to FR3_h. The second communication (e.g., 5G communication) uplink frequency band may have the frequency range of F_1 to F_h.

According to various embodiments, if an uplink signal based on the first communication and an uplink signal based on the second communication are transmitted at the same time, a frequency of an IMD component may be incurred. The frequency of the IMD component may be incurred in various frequency bands. For example, a $3^{rd}$ order IMD component frequency area may be "2×a first communication frequency–a second communication frequency." According to various embodiments, the $3^{rd}$ order IMD component frequency area may at least partially overlap a first communication downlink (DL) frequency band. Accordingly, a $3^{rd}$ order IMD component frequency signal may affect reception of a first communication downlink signal.

As illustrated in FIGS. 5 and 6, in the case of an electronic device that provides dual connectivity, two or more TX transmissions are performed in a single electronic device in order to access to two communication networks. Accordingly, harmonic/intermodulation interference or intermodulation spurious may occur. According to various embodiments, if it is difficult for different communication technologies to be physically distant from each other due to the internal space constraint of an electronic device, the maximum power reduction (MPR) may be applied as much as interference and spurious does not cause a problem. If the maximum power reduction is applied, uplink coverage (UL coverage) may deteriorate. According to various embodiments described below, information of a first signal transmitted via the first transceiver 530a may be monitored in real time, and control may be performed so that an MPR is not excessively applied to a signal transmitted via the second transceiver 530b.

Hereinafter, a power control method of an electronic device that provides dual connectivity according to various embodiments will be described with reference to FIGS. 7 to 18.

Figure 7:
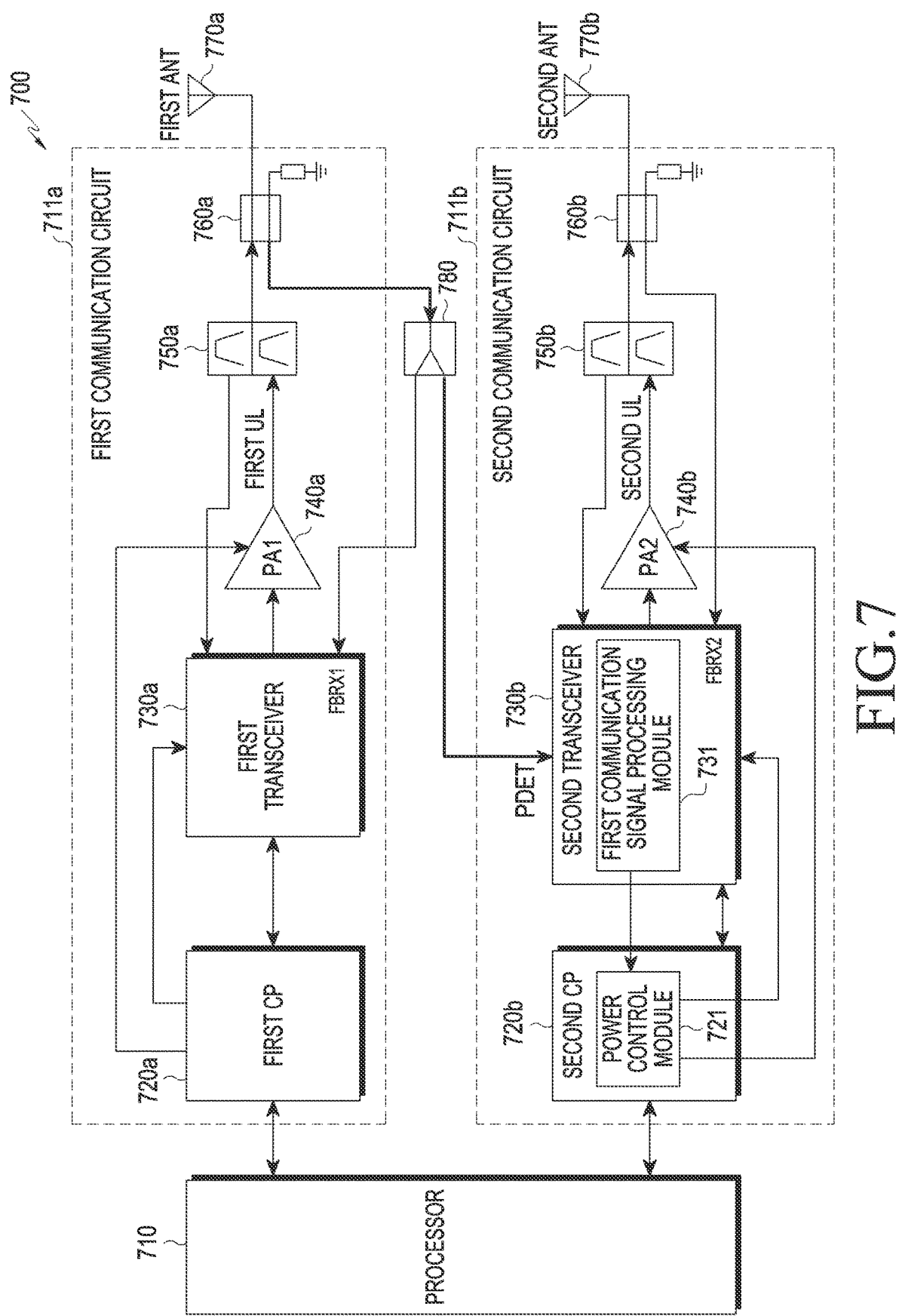
FIG. 7 is another block diagram of an electronic device that provides dual connectivity according to an embodiment of the disclosure.

FIG. 7 is another block diagram of an electronic device that provides dual connectivity according to an embodiment of the disclosure.

Referring to FIG. 7, an electronic device 700 according to various embodiments may include at least one processor 710 (e.g., an application processor), a first communication processor 720a, a second communication processor 720b, a first transceiver 730a, a second transceiver 730b, a first power amplifier 740a, a second power amplifier 740b, a first duplexer 750a, a second duplexer 750b, a first coupler 760a, a second coupler 760b, a first antenna 770a, and a second antenna 770b of a first communication circuit 711a and a second communication circuit 711b, coupled by a splitter 780. The electronic device 700 of FIG. 7 may be similar to, or the same as, the electronic device 101 of FIG. 1, FIG. 2A, or FIG. 2B. Each component of the electronic device 700 of FIG. 7 may perform an operation, which is the same as, or similar to, the operation performed by each corresponding component of the electronic device 500 of FIG. 5.

The processor 710 may include a controller (or a control circuitry) and/or a shared memory (e.g., a memory shared by the first communication processor 720a and the second communication processor 720b).

The first communication processor 720a may establish a communication channel of a band to be used for wireless communication with a first communication network, and may support network communication via the established communication channel. According to various embodiments, the first communication network may include a 2G, 3G, 4G, or long-term evolution (LTE) network. According to various embodiments, a second communication network may be a 5G network defined in 3GPP.

According to an embodiment, the first communication processor 720a may perform data transmission or reception with the second communication processor 720b. For example, the first communication processor 720a may perform data transmission or reception with the second communication processor 720b via a UART or a PCIe interface. According to various embodiments, the first communication processor 720a may perform, with the second communication processor 720b, transmission or reception of at least one information among activated band information, channel allocation information, communication state information (idle, sleep, active) associated with the state of communication with a network, sensing information, information associated with an output strength, or resource block (RB) allocation information.

According to an embodiment, the first communication processor 720a may not be directly connected with the second communication processor 720b. In this instance, the first communication processor 720a may perform data transmission or reception with the second communication processor 720b, via the processor 710 (e.g., an application processor).

According to an embodiment, the first communication processor 720a and the second communication processor 720b may be implemented in a single chip or a single package. According to various embodiments, the first communication processor 720a or the second communication processor 720b may be implemented in a single chip or a single package, together with the processor 120, the auxiliary processor 123, or the communication module 190. For example, as illustrated in FIG. 2B, the integrated communication processor 260 may support both a function for communicating with the first communication network and a function for communicating with the second communication network.

According to various embodiments, the first transceiver 730a may combine a PLL_1 signal and a signal transmitted from the first communication processor 720a using a mixer, and may output a radio frequency (RF) signal which is appropriate for the frequency of the first communication network. The second transceiver 730b may combine a PLL_2 signal and a signal transmitted from the second communication processor 720b using a mixer, and may output a radio frequency (RF) signal which is appropriate for the frequency of the second communication network.

According to various embodiments, the first power amplifier 740a may include an amplifier that is connected to the first transceiver 730a, amplifies an RF signal, decreases distortion of an output signal, or maintains a high-efficiency characteristic. The second power amplifier 740b may include an amplifier that is connected to the second transceiver 730b, amplifies an RF signal, decreases distortion of an output signal, or maintains a high-efficiency characteristic.

According to various embodiments, the first duplexer 750a may receive a first signal from the first power amplifier 740a and may transmit the first signal to the first antenna 770a, and may receive a downlink signal received via the first antenna 770a and may transmit the downlink signal to the first transceiver 730a. The second duplexer 750b may receive a second signal from the second power amplifier 740b and may transmit the second signal to the second antenna 770b, and may receive a downlink signal received via the second antenna 770b and may transmit the downlink signal to the second transceiver 730b.

According to various embodiments, the first power amplifier 740a may amplify a first signal (TX1) received from the first transceiver 730a to a designated gain according to the control of the first communication processor 720a, and may transmit the same to the first antenna 770a via the first coupler 760a. The second power amplifier 740b may amplify a second signal (TX2) received from the second transceiver 730b to a designated gain according to the control of the second communication processor 720b, and may transmit the same to the second antenna 770b via the second coupler 760b.

According to various embodiments, at least a part of the first signal transmitted via the first coupler 760a may be fed back and transmitted to the splitter 780. The signal transmitted to the splitter 780 may be distributed and transmitted to the first transceiver 730a and the second transceiver 730b. According to various embodiments, at least a part of the signal distributed from the splitter 780 may be input to the PDET port of the second transceiver 730b. The PDET port may be included as a port separate from an FBRX2 port, and may be connected to a first communication signal processing module 731 so as to analyze another communication signal by consuming a relatively small amount of current (e.g., an extremely small amount of current).

According to various embodiments, the feedback signal input to the PDET port of the second transceiver 730b may go through signal-processing performed by the first communication signal processing module 731, and may be provided to the second communication processor 720b. A power control module 721 of the second communication processor 720b may control the power of the second signal, based on the signal processed by the first communication signal processing module 731.

According to various embodiments, the first communication signal processing module 731 may convert the signal transmitted via the splitter 780 into a baseband signal, and may transmit the baseband signal obtained via conversion to the second communication processor 720b. According to various embodiments, the first communication signal processing module 731 may detect an envelope of the signal transmitted via the splitter 780, and may output an analog signal. The second transceiver 730b may transmit the output analog signal to the second communication processor 720b. According to various embodiments, the first communication signal processing module 731 may include a filter of which the center frequency varies according to a control signal of the second communication processor 720b. The second communication processor 720b may determine the location information of a resource block corresponding to the first signal, based on the control signal and the analog signal transmitted from the second transceiver 730b.

According to various embodiments, the second communication processor 720b may control the transmission power of the second signal, at least partially based on information determined by the power control module 721. The power control module 721 of the second communication processor 720b may determine the transmission power of the first signal, based on the analog signal received from the second transceiver 730b, and may determine the transmission power of the second signal, based at least on the transmission power of the first signal and the maximum transmission power of the electronic device 700.

According to various embodiments, the second communication processor 720b may determine resource block (RB) allocation information of the first signal, based on the analog signal received from the second transceiver 730b, and may determine the transmission power of the second signal, based at least on the resource block allocation information of the first signal. According to various embodiments, the resource block allocation information of the first signal may include the number of the resource blocks allocated and/or the location information of the resource blocks, and the number of resource blocks allocated may be determined based on the bandwidth of the first signal. According to various embodiments, the second communication processor 720b may determine the frequency band of the first signal, based on the resource block allocation information of the first signal, may determine a generable intermodulation distortion (IMD) interference signal, based on the determined frequency band of the first signal and the frequency band of the second signal, and may determine the maximum transmission power of the second signal, based at least on the transmission power of the first signal and the generable IMD interference signal.

The second communication processor 720b may control the gain of the second signal transmitted via the second transceiver 730b, and may control the bias of the second power amplifier 740b, according to a control signal output from the power control module 721.

Figure 8:
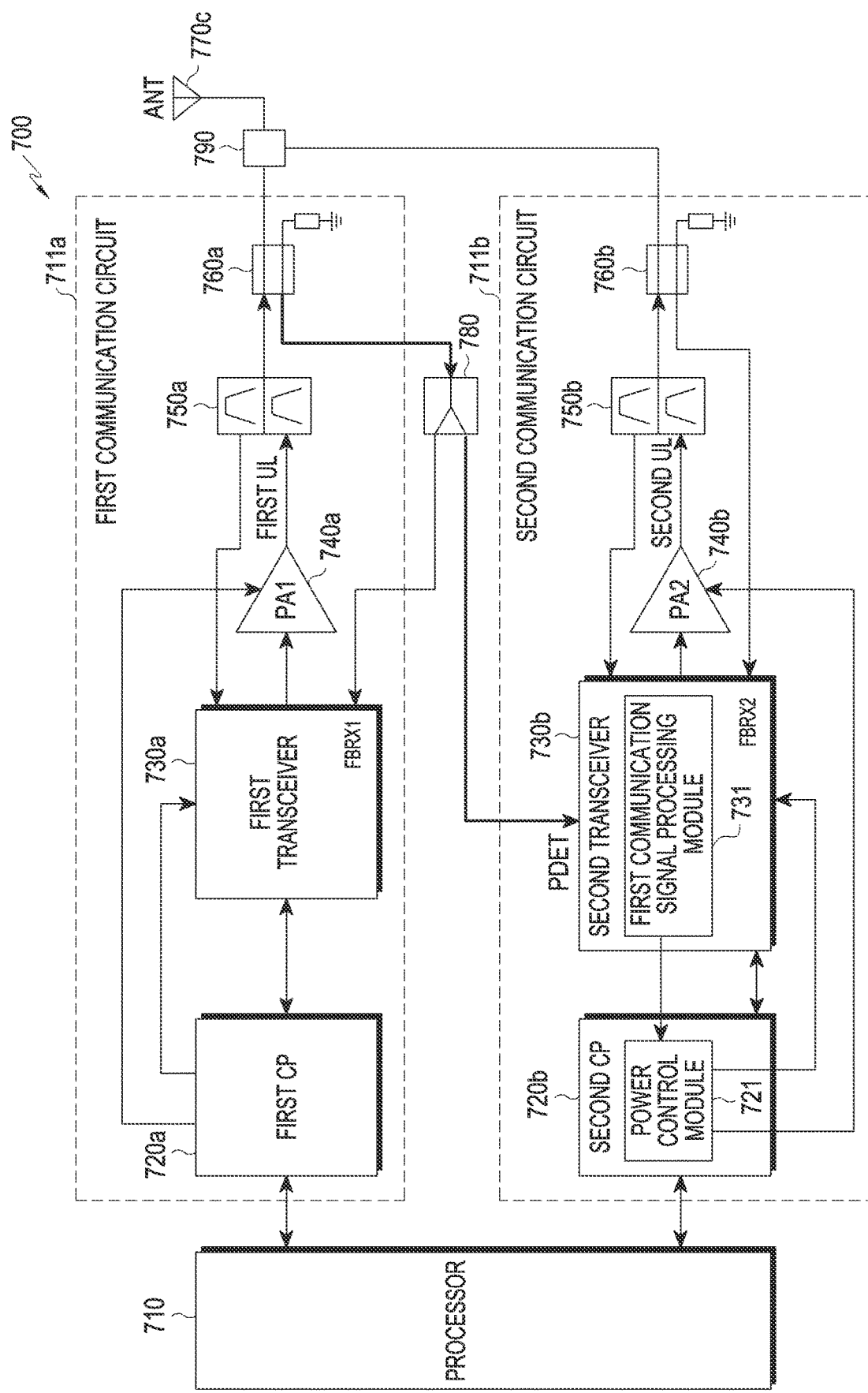
FIG. 8 is another block diagram of an electronic device that provides dual connectivity according to an embodiment of the disclosure.

FIG. 8 is another block diagram of an electronic device that provides dual connectivity according to an embodiment of the disclosure.

Referring to FIG. 8, a first signal generated from the first transceiver 730a may be transmitted to an antenna 770c via the first coupler 760a, and a second signal generated from the second transceiver 730b may be transmitted to the same antenna 770c via the second coupler 760b.

According to various embodiments, a diplexer 790 may be connected between the antenna 770c and the first coupler 760a or the second coupler 760b. The diplexer 790 may simultaneously transmit a first signal of a first frequency band, which is transmitted via the first coupler 760a, and a second signal of a second frequency band, which is transmitted via the second coupler 760b.

Figure 9:
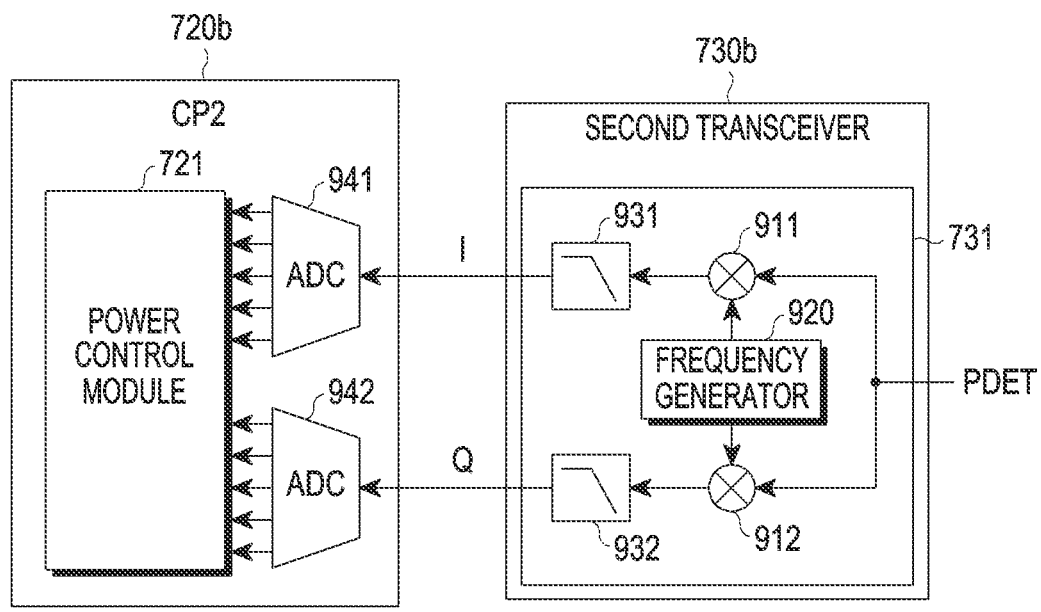
FIG. 9 is a block diagram illustrating a structure of a second communication processor and a second transceiver according to an embodiment of the disclosure.

FIG. 9 is a block diagram illustrating a structure of a second communication processor and a second transceiver according to an embodiment of the disclosure.

Referring to FIG. 9, the first communication signal processing module 731 of the second transceiver 730b may include a first mixer 911, a second mixer 912, a frequency generator 920, a first low pass filter (LPF) 931, or a second LPF 932. The second communication processor 720b may include the power control module 721, a first analog to a digital converter (ADC) 941, or a second ADC 942.

According to various embodiments, a signal received via the PDET port of the second transceiver 730b may be input to the first mixer 911 and the second mixer 912 of the first communication signal processing module 731. The first mixer 911 and the second mixer 912 may receive a signal corresponding to the frequency of a first communication signal from the frequency generator 920, and may perform combination, so as to output a baseband signal (e.g., I, Q signal) of the first signal. The output signals of the first mixer 911 and the second mixer 912 may go through low-pass filtering via the first LPF 931 and the second LPF 932, and may be transmitted to the second communication processor 720b.

According to various embodiments, the second communication processor 720b may perform digital signal processing with respect to an analog signal (I signal) output from the first LPF 931, using the first ADC 941, and may transmit the same to the power control module 721. The second communication processor 720b may perform digital signal processing with respect to an analog signal (Q signal) output from the second LPF 932, using the second ADC 942, and may transmit the same to the power control module 721.

According to various embodiments, the power control module 721 may analyze the signals received from the first ADC 941 and the second ADC 942, and may determine the resource block allocation information corresponding to the first signal and the transmission power of the first signal. The power control module 721 may control the transmission power of the second signal, based at least on the determined resource block allocation information corresponding to the first signal and the transmission power of the first signal.

Figure 10:
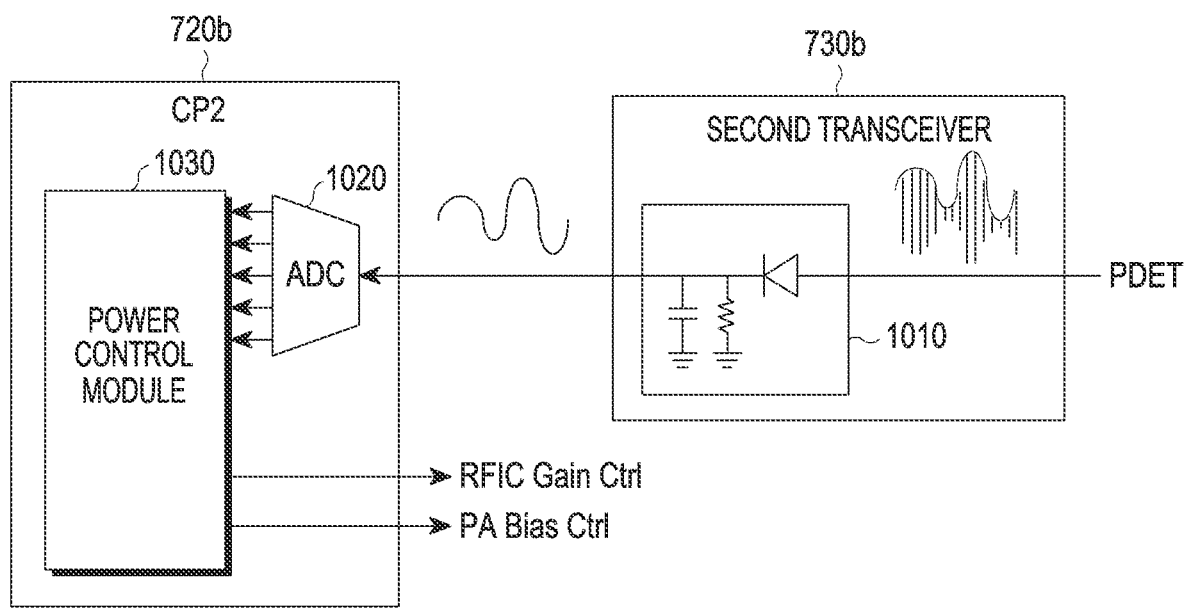
FIG. 10 is another block diagram illustrating a structure of a second communication processor and a second transceiver according to an embodiment of the disclosure.

FIG. 10 is another block diagram illustrating a structure of a second communication processor and a second transceiver according to an embodiment of the disclosure.

Referring to FIG. 10, the first communication signal processing module 731 of the second transceiver 730b according to an embodiment may include an envelope detector 1010. The second communication processor 720b may include a power control module 1030 and/or an ADC 1020.

According to various embodiments, a signal received via the PDET port of the second transceiver 730b may go through the envelope detector 1010 of the first communication signal processing module 731 so that the envelope of the first signal is detected and output the envelope. The output signal of the envelope detector 1010 may be transmitted to the second communication processor 720b.

According to various embodiments, the second communication processor 720b may perform digital signal processing with respect to the signal output from the envelope detector 1010, using the ADC 1020, and may transmit the same to the power control module 1030.

According to various embodiments, the power control module 1030 may analyze the signal received from the ADC 1020, and may determine the resource block allocation information corresponding to the first signal and/or the transmission power of the first signal. The power control module 1030 may control the transmission power of a second signal, based at least on the determined resource block allocation information corresponding to the first signal and the transmission power of the first signal. According to various embodiments, the power control module 1030 may determine the bandwidth of the received signal, and may determine the number of resource blocks allocated, based on the determined bandwidth.

According to various embodiments, the power control module 1030 may calculate a power headroom appropriate for the power class of the electronic device 700, based on the analyzed information. For example, the power headroom may be calculated to be Head room=$P_{MAX}-P_{LTE}$. The power control module 1030 may distribute uplink power of the first communication network and uplink power of the second communication network, based on the analyzed information, and may control the transmission power of the second signal based on an estimation associated with occurrence of interference/spurious caused by TX harmonic/intermodulation distortion.

Figure 11:
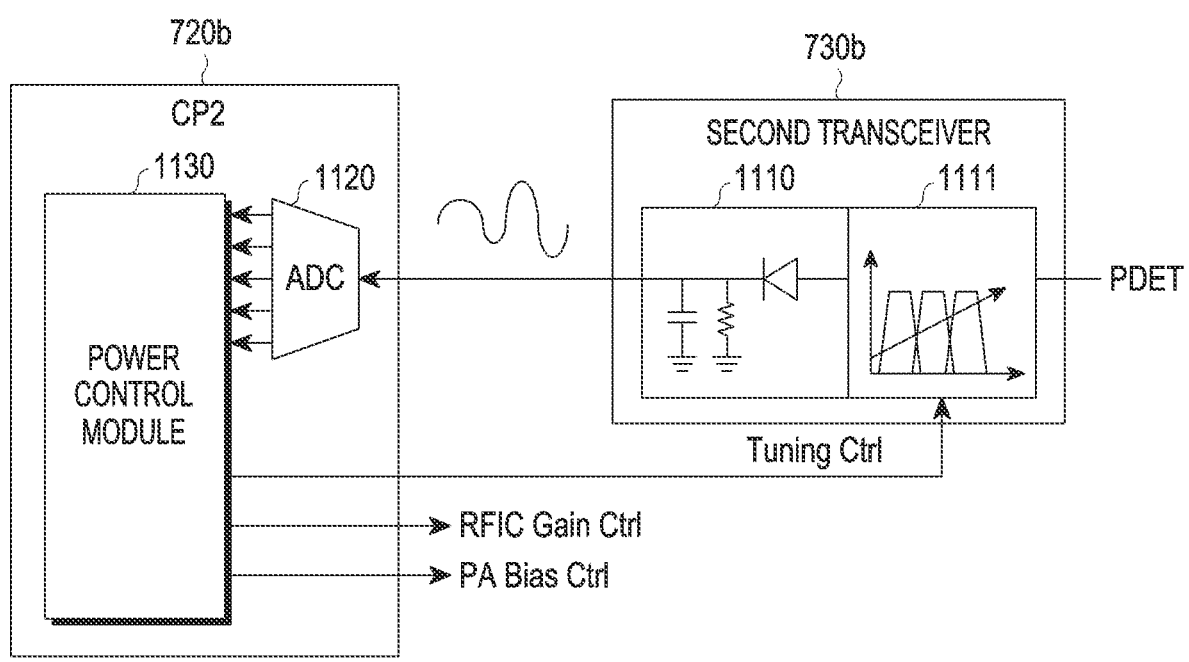
FIG. 11 is another block diagram illustrating a structure of a second communication processor and a second transceiver according to an embodiment of the disclosure.

FIG. 11 is another block diagram illustrating a structure of a second communication processor and a second transceiver according to an embodiment of the disclosure.

Referring to FIG. 11, the first communication signal processing module 731 of the second transceiver 730b according to an embodiment may include a filter 1111 and/or an envelope detector 1110. The second communication processor 720b may include a power control module 1130 and/or an ADC 1120.

According to various embodiments, a signal received via the PDET port of the second transceiver 730b may go through the filter 1111 of the first communication signal processing module 731, and may go through the envelope detector 1110 so that the envelope of the first signal is detected and output. The output signal of the envelope detector 1110 may be provided to the second communication processor 720b.

According to various embodiments, the second communication processor 720b may perform digital signal processing with respect to the signal output from the envelope detector 1110, using the ADC 1120, and may provide the same to the power control module 1130.

According to various embodiments, the power control module 1130 may analyze the signal received from the ADC 1120, and may determine the resource block allocation information corresponding to the first signal and the transmission power of the first signal. The power control module 1130 may control the transmission power of a second signal, based at least on the determined resource block allocation information corresponding to the first signal and the transmission power of the first signal. According to various embodiments, the power control module 1130 may determine the bandwidth of the received signal, and may determine the number of resource blocks allocated, based on the determined bandwidth.

According to various embodiments, the power control module 1130 may transmit a control signal (e.g., a frequency tuning control signal) to the filter 1111 of the second transceiver 730b, so as to change the center frequency of the filter 1111. According to various embodiments, the power control module 1130 may determine the location information of a resource block corresponding to the first signal, based on the control signal for controlling the filter 1111 and an analog signal transmitted from the second transceiver 730*b*.

According to various embodiments, the power control module 1130 may calculate a power headroom appropriate for the power class of the electronic device 700, based on the analyzed information. For example, the power headroom may be calculated to be Head room=$P_{MAX}-P_{LTE}$. The power control module 1130 may distribute uplink power of the first communication network and uplink power of the second communication network, based on the analyzed information, and may control the transmission power of a second signal, based on an estimation associated with occurrence of interference/spurious caused by TX harmonic/intermodulation distortion.

Figure 12A:
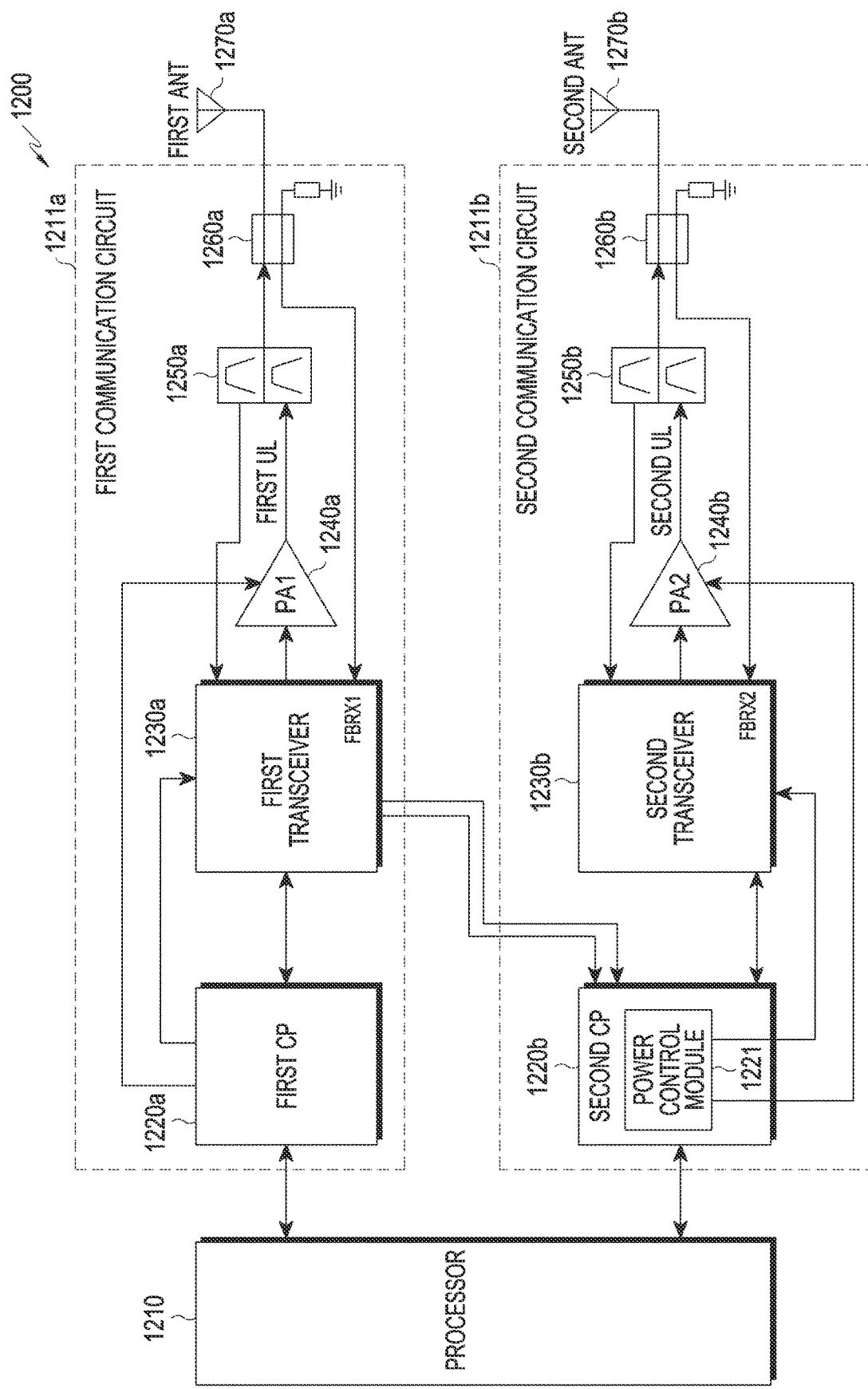
FIG. 12A is another block diagram of an electronic device that provides dual connectivity according to an embodiment of the disclosure.

FIG. 12A is another block diagram of an electronic device that provides dual connectivity according to an embodiment of the disclosure.

Referring to FIG. 12A, an electronic device 1200 according to various embodiments may include at least one processor 1210 (e.g., an application processor), a first communication processor 1220*a*, a second communication processor 1220*b*, a first transceiver 1230*a*, a second transceiver 1230*b*, a first power amplifier 1240*a*, a second power amplifier 1240*b*, a first duplexer 1250*a*, a second duplexer 1250*b*, a first coupler 1260*a*, a second coupler 1260*b*, a first antenna 1270*a*, and/or a second antenna 1270*b* of a first communication circuit 1211*a*, and a second communication circuit 1211*b*. Each component of the electronic device 1200 of FIG. 12A may perform an operation, which is the same as, or similar to, the operation performed by each corresponding component of the electronic device 500 of FIG. 5 or the electronic device 700 of FIG. 7.

The processor 1210 may include a controller (or a control circuitry) and/or a shared memory (e.g., a memory shared by the first communication processor 1220*a* and the second communication processor 1220*b*).

The first communication processor 1220*a* may establish a communication channel of a band to be used for wireless communication with a first communication network, and may support network communication via the established communication channel. According to various embodiments, the first communication network may include a 2G, 3G, 4G, or long-term evolution (LTE) network. According to various embodiments, a second communication network may be a 5G network defined in 3GPP.

According to an embodiment, the first communication processor 1220*a* may perform data transmission or reception with the second communication processor 1220*b*. For example, the first communication processor 1220*a* may perform data transmission or reception with the second communication processor 1220*b* via a UART or a PCIe interface. According to various embodiments, the first communication processor 1220*a* may perform, with the second communication processor 1220*b*, transmission or reception of at least one information among activated band information, channel allocation information, communication state information (idle, sleep, active) associated with the state of communication with a network, sensing information, information associated with an output strength, or resource block (RB) allocation information.

According to an embodiment, the first communication processor 1220*a* may not be directly connected to the second communication processor 1220*b*. In this instance, the first communication processor 1220*a* may perform data transmission or reception with the second communication processor 1220*b*, via the processor 1210 (e.g., an application processor).

According to an embodiment, the first communication processor 1220*a* and the second communication processor 1220*b* may be implemented in a single chip or a single package. According to various embodiments, the first communication processor 1220*a* or the second communication processor 1220*b* may be implemented in a single chip or a single package, together with the processor 120, the auxiliary processor 123, or the communication module 190. For example, as illustrated in FIG. 2B, the integrated communication processor 260 may support both a function for communicating with the first communication network and a function for communicating with the second communication network.

According to various embodiments, the first transceiver 1230*a* may combine a PLL_1 signal and a signal transmitted from the first communication processor 1220*a* using a mixer, and may output a radio frequency (RF) signal which is appropriate for the frequency of the first communication network. The second transceiver 1230*b* may combine a PLL_2 signal and a signal transmitted from the second communication processor 1220*b* using a mixer, and may output a radio frequency (RF) signal which is appropriate for the frequency of the second communication network.

According to various embodiments, the first power amplifier 1240*a* may include an amplifier that is connected to the first transceiver 1230*a*, amplifies an RF signal, decreases distortion of an output signal, or maintains a high-efficiency characteristic. The second power amplifier 1240*b* may include an amplifier that is connected to the second transceiver 1230*b*, amplifies an RF signal, decreases distortion of an output signal, or maintains a high-efficiency characteristic.

According to various embodiments, the first duplexer 1250*a* may receive a first signal from the first power amplifier 1240*a* and may transmit the first signal to the first antenna 1270*a*, and may receive a downlink signal received via the first antenna 1270*a* and may transmit the downlink signal to the first transceiver 1230*a*. The second duplexer 1250*b* may receive a second signal from the second power amplifier 1240*b* and may transmit the second signal to the second antenna 1270*b*, and may receive a downlink signal received via the second antenna 1270*b* and may transmit the downlink signal to the second transceiver 1230*b*.

According to various embodiments, the first power amplifier 1240*a* may amplify a first signal (TX1) received from the first transceiver 1230*a* to a designated gain according to the control of the first communication processor 1220*a*, and may transmit the same to the first antenna 1270*a* via the first coupler 1260*a*. The second power amplifier 1240*b* may amplify a second signal (TX2) received from the second transceiver 1230*b* to a designated gain according to the control of the second communication processor 1220*b*, and may transmit the same to the second antenna 1270*b* via the second coupler 1260*b*.

According to various embodiments, at least a part of the first signal transmitted via the first coupler 1260*a* may be fed back and transmitted to the first transceiver 1230*a*.

Figure 12B:
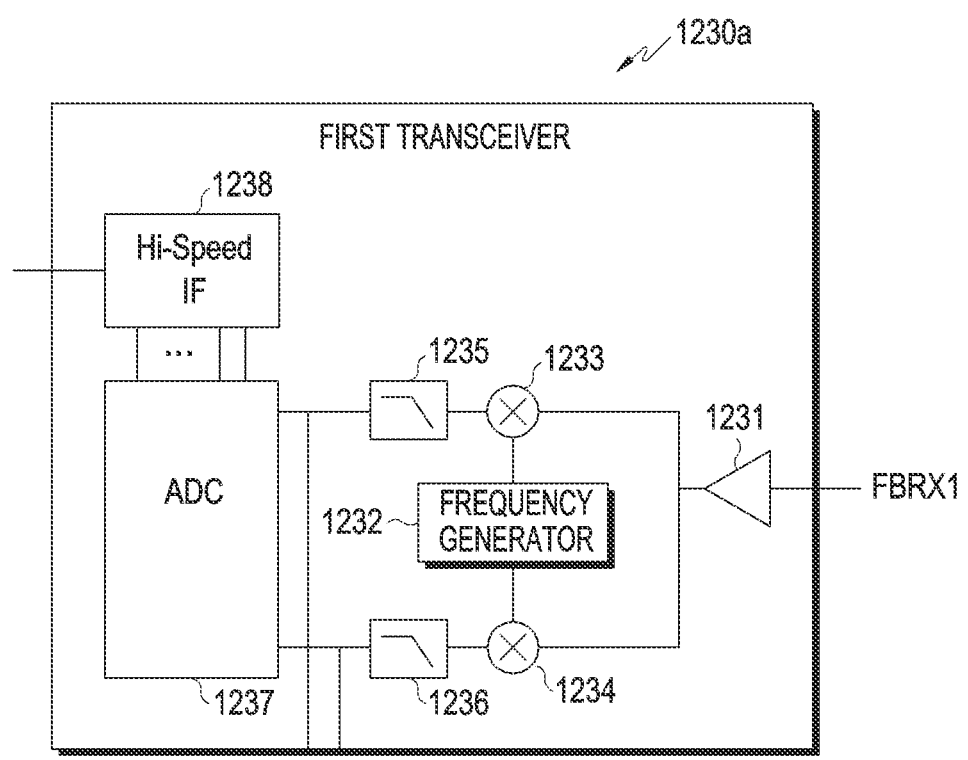
FIG. 12B is a block diagram illustrating a structure of a first transceiver according to an embodiment of the disclosure.

FIG. 12B is a block diagram illustrating a structure of a first transceiver according to various embodiments.

Referring to FIG. 12B, the first transceiver 1230*a* may include an amplifier 1231, a first mixer 1233, a second mixer 1234, a frequency generator 1232, a first LPF 1235, a second LPF 1236, an ADC 1237, and/or a high-speed interface 1238.

According to various embodiments, a signal received via the FBRX1 port of the first transceiver 1230a may be amplified via the amplifier 1231, and may be input to the first mixer 1233 and the second mixer 1234. The first mixer 1233 and the second mixer 1234 may receive a signal corresponding to the frequency of a first communication signal from the frequency generator 1232, and may perform combination, so as to output a baseband signal (e.g., I, Q signal) of the first signal. The output signals of the first mixer 1233 and the second mixer 1234 may go through low-pass filtering via the first LPF 1235 and the second LPF 1236, and may be digital signal processed by the ADC 1237.

According to various embodiments, the baseband I and Q signals which are digital-processed by the ADC 1237 may be transmitted to a power control module 1221 of the second communication circuit 1220b via the high-speed interface 1238.

According to various embodiments, the power control module 1221 may analyze the signal received from the first transceiver 1230a, and may determine the resource block allocation information corresponding to the first signal and/or the transmission power of the first signal. The power control module 1221 may control the transmission power of a second signal, based at least on the determined resource block allocation information corresponding to the first signal and the transmission power of the first signal.

According to various embodiments, the second communication processor 1220b may control the transmission power of the second signal, at least partially based on information determined by the power control module 1221. The power control module 1221 of the second communication processor 1220b may determine the transmission power of the first signal, based on the analog signal received from the first transceiver 1230a, and may determine the transmission power of the second signal, based at least on the transmission power of the first signal and the maximum transmission power of the electronic device 1200.

According to various embodiments, the second communication processor 1220b may determine resource block (RB) allocation information of the first signal, based on the analog signal received from the first transceiver 1230a, and may determine the transmission power of the second signal, based at least on the resource block allocation information of the first signal. According to various embodiments, the resource block allocation information of the first signal may include the number of the resource blocks allocated and/or the location information of the resource blocks. The number of resource blocks allocated may be determined based on the bandwidth of the first signal. According to various embodiments, the second communication processor 1220b may determine the frequency band of the first signal, based on the resource block allocation information of the first signal, may determine a generable intermodulation distortion (IMD) interference signal, based on the determined frequency band of the first signal and the frequency band of the second signal, and may determine the maximum transmission power of the second signal, based at least on the transmission power of the first signal and the generable IMD interference signal.

The second communication processor 1220b may control the gain of the second signal transmitted via the second transceiver 1230b, and may control the bias of the second power amplifier 1240b, according to a control signal output from the power control module 1221.

Figure 13:
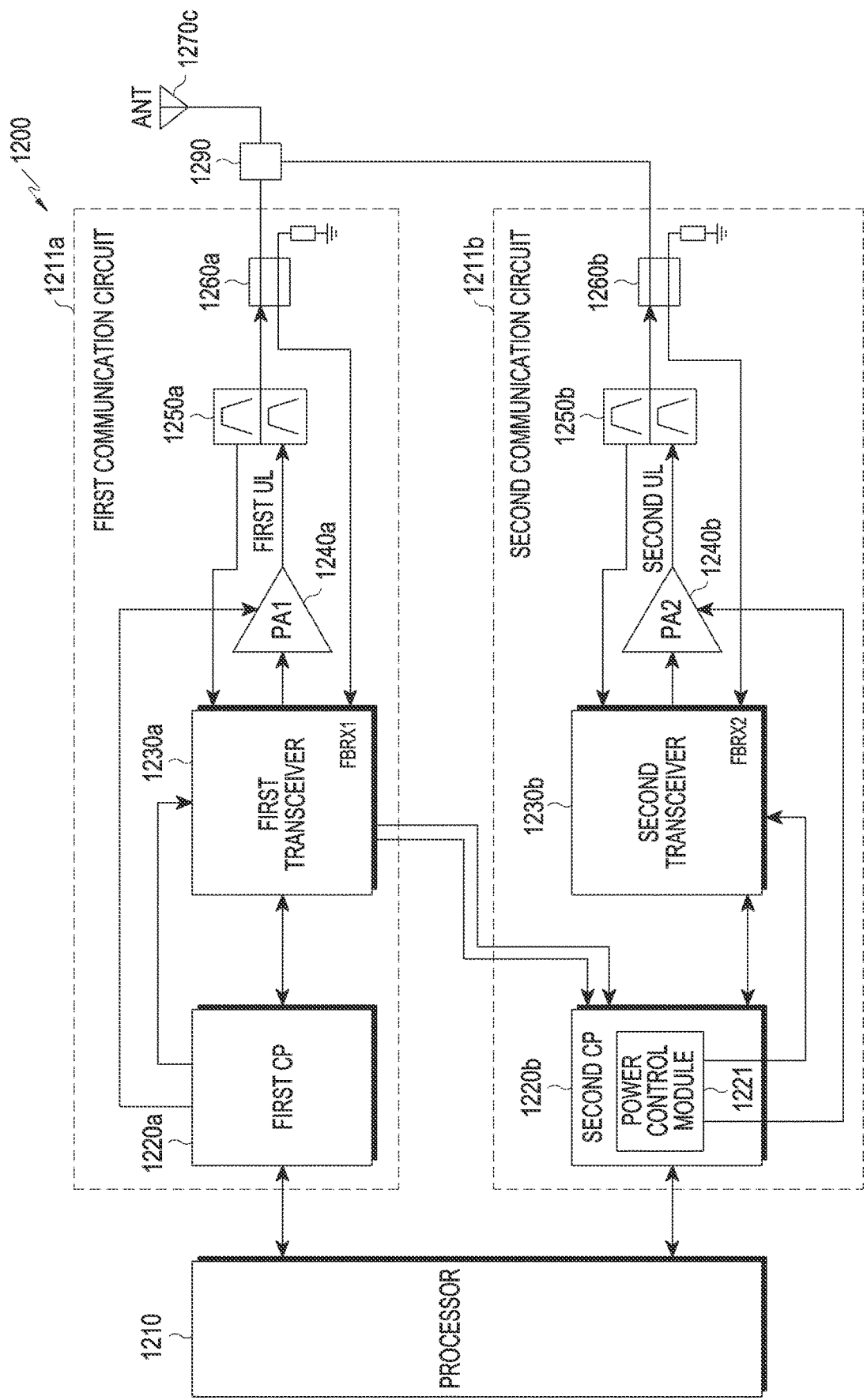
FIG. 13 is another block diagram of an electronic device that provides dual connectivity according to an embodiment of the disclosure.

FIG. 13 is another block diagram of an electronic device that provides dual connectivity according to an embodiment of the disclosure.

Referring to FIG. 13, a first signal generated from the first transceiver 1230a may be transmitted to an antenna 1270c via the first coupler 1260a, and a second signal generated from the second transceiver 1230b may be transmitted to the same antenna 1270c via the second coupler 1260b.

According to various embodiments, a diplexer 1290 may be connected between the antenna 1270c and the first coupler 1260a or the second coupler 1260b. The diplexer 1290 may simultaneously transmit a first signal of a first frequency band, which is transmitted via the first coupler 1260a, and a second signal of a second frequency band, which is transmitted via the second coupler 1260b.

According to various embodiments, an electronic device may include a housing, at least one antenna 770a, 770b, and 770c disposed inside the housing or disposed on at least a part of the housing, the first transceiver 730a configured to generate a first signal corresponding to a first communication network, and to transmit the first signal to the at least one antenna, the second transceiver 730b configured to generate a second signal corresponding to a second communication network, and to transmit the second signal to the at least one antenna, the first coupler 760a electrically connected between the at least one antenna and the first transceiver, the first communication processor 720a operatively connected to the first transceiver, and the second communication processor 720b operatively connected to the second transceiver, wherein the second communication processor is configured to control a transmission power of the second signal, at least partially based on a signal received via feedback by the first coupler.

According to various embodiments, the second communication processor is configured to determine a transmission power of the first signal, based on the signal received via feedback by the first coupler, and to determine the transmission power of the second signal, based at least on the transmission power of the first signal and a maximum transmission power of the electronic device.

According to various embodiments, the second communication processor is configured to determine resource block allocation information of the first signal, based on the signal received via feedback by the first coupler, and to determine the transmission power of the second signal, based at least on the resource block allocation information of the first signal.

According to various embodiments, the resource block allocation information of the first signal may include at least one of a number of the resource blocks allocated or location information associated with the resource blocks.

According to various embodiments, the number of resource blocks allocated is determined based on a bandwidth of the first signal.

According to various embodiments, the second communication processor is configured to: determine a frequency band of the first signal, based on the resource block allocation information of the first signal; determine a generable intermodulation distortion (IMD) interference signal, based on the determined frequency band of the first signal and a frequency band of the second signal; and determine a maximum transmission power of the second signal, based at least on the transmission power of the first signal and the generable IMD interference signal.

According to various embodiments, the at least one antenna may include a first antenna disposed inside the housing, or disposed on a first part of the housing, and a second antenna disposed to be separate from the first part of the housing, and disposed inside the housing or on a second part of the housing, wherein the first transceiver is configured to transmit the generated first signal to the first antenna, and the second transceiver is configured to transmit the generated second signal to the second antenna.

According to various embodiments, the electronic device may further include the splitter 780 electrically connected to the first coupler, and configured to distribute and transmit the signal received via feedback from the first coupler, to the first transceiver and the second transceiver.

According to various embodiments, the second transceiver is configured to convert the signal transmitted via the splitter into a baseband signal, and to transmit the baseband signal obtained via conversion to the second communication processor.

According to various embodiments, the second transceiver may include the envelope detector 1010 configured to detect an envelope of the signal transmitted via the splitter, and to output an analog signal, and the second transceiver is configured to transmit the analog signal output via the envelope detector to the second communication processor.

According to various embodiments, the second transceiver further includes the filter 1111 of which a center frequency varies according to a control signal of the second communication processor, wherein the second communication processor is configured to determine location information of a resource block corresponding to the first signal, based on the control signal and the analog signal transmitted from the second transceiver.

An electronic device according to any one of the various embodiments may include a housing, at least one antenna 770a, 770b, and 770c disposed inside the housing, or disposed on at least a part of the housing, the first transceiver 730a configured to generate a first signal corresponding to a first communication network, and to transmit the first signal to the at least one antenna, the second transceiver 730b configured to generate a second signal corresponding to a second communication network, and to transmit the second signal to the at least one antenna, the first coupler 760a electrically connected between the at least one antenna and the first transceiver, and configured to transmit at least a part of the first signal received from the first transceiver to the at least one antenna, and at least one communication processor 720a and 720b operatively connected with the first transceiver or the second transceiver, wherein the at least one communication processor is configured to control a transmission power of the second signal, at least partially based on a signal received via feedback by the first coupler.

Figure 14:
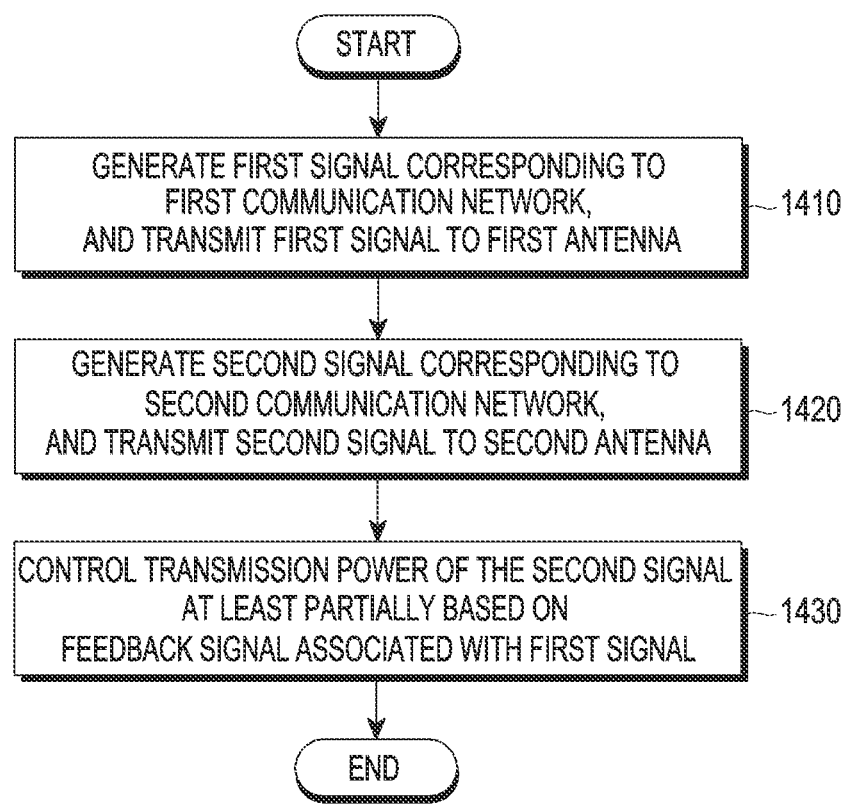
FIG. 14 is a flowchart illustrating an operation method of an electronic device according to an embodiment of the disclosure.

FIG. 14 is a flowchart illustrating an operation method of an electronic device according to an embodiment of the disclosure.

Referring to FIG. 14, in operation 1410, an electronic device (e.g., the electronic device 700 of FIG. 7) may generate a first signal corresponding to a first communication network, and may transmit the same to a first antenna. In operation 1420, the electronic device may generate a second signal corresponding to a second communication network, and may transmit the same to a second antenna. In operation 1430, the electronic device may control the transmission power of the second signal, at least partially based on a feedback signal associated with the first signal.

Figure 15:
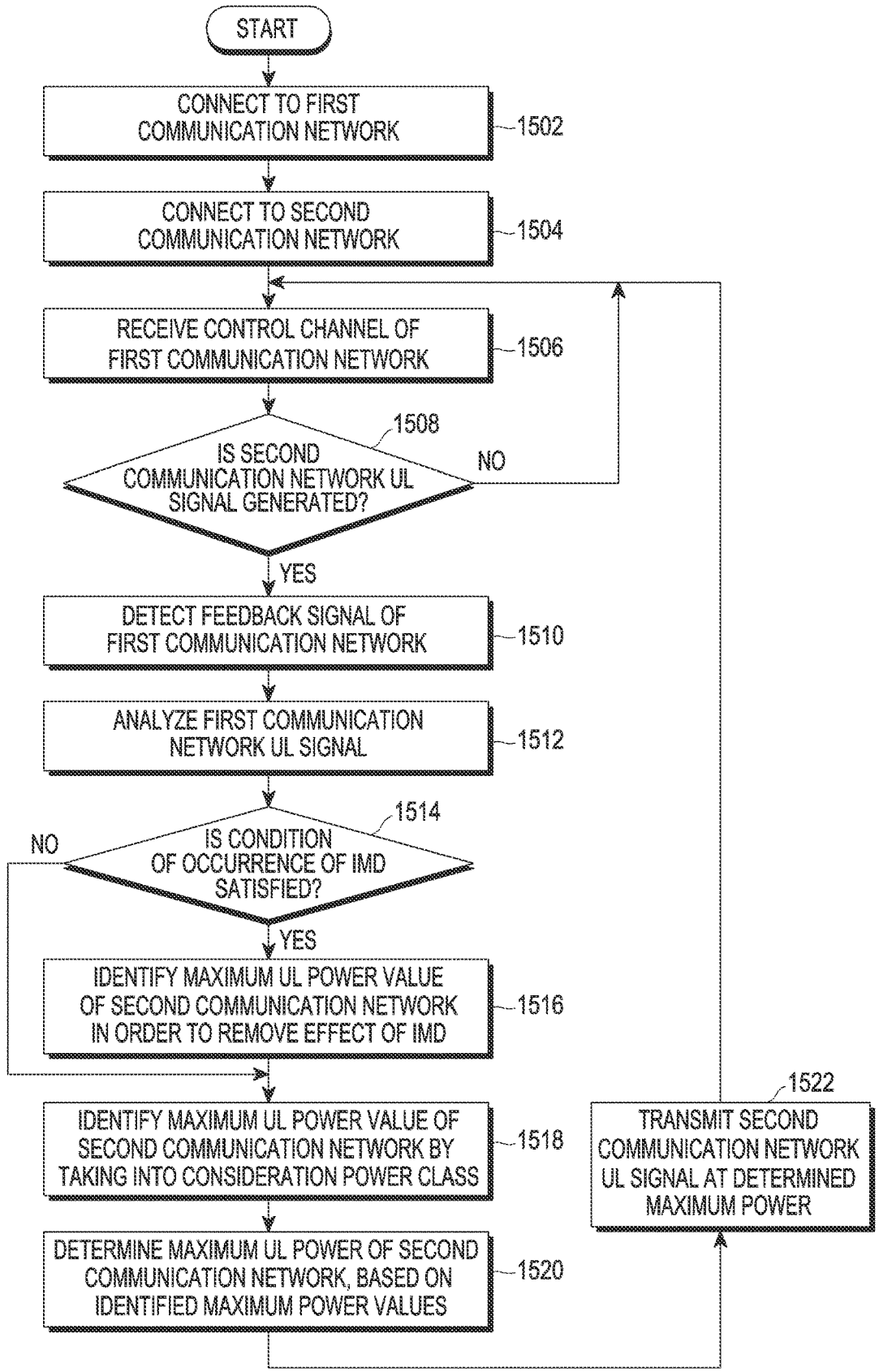
FIG. 15 is a flowchart illustrating an operation method of an electronic device according to an embodiment of the disclosure.

FIG. 15 is a flowchart illustrating an operation method of an electronic device according to an embodiment of the disclosure.

Referring to FIG. 15, in operation 1502, an electronic device (e.g., the electronic device 700 of FIG. 7) may connect to a first communication network. In operation 1504, the electronic device may connect to a second communication network. In operation 1506, the electronic device may receive and decode a control channel of the first communication network.

If it is determined that an uplink (UL) signal via the second communication network is generated in operation 1508, the electronic device may detect a feedback signal of the first signal transmitted to the first communication network. According to various embodiments, in operation 1510, the electronic device may detect (e.g., envelope detection) at least a part of the first signal transmitted to the first communication network, via feedback by the coupler, and may transmit the same to the second communication processor 720b.

In operation 1512, the electronic device (e.g., the second communication processor 720b of the electronic device) may analyze an uplink signal of the first signal transmitted via the first communication network. According to various embodiments, the electronic device may determine the frequency range (RF) of the first signal, the uplink bandwidth of the first signal, or the uplink transmission power of the first signal.

In operation 1514, the electronic device may determine whether a condition of occurrence of IMD, spurious, or desensitization is satisfied, based on the analysis result. Whether the condition is satisfied may be determined based on the bandwidth and the frequency range of the first signal.

According to various embodiments, if the second communication processor identifies the frequency allocation information associated with the uplink signal of the first signal transmitted to the first communication network, the second communication processor may identify whether the IMD signal component in the uplink frequency band of the first communication and the uplink frequency band of the second signal overlaps the downlink frequency band of the first signal or the downlink frequency band of the second signal, and may control the uplink signal power of the second signal.

If the determination shows that the condition of occurrence of IMD is satisfied, the electronic device may identify the maximum uplink power of the second signal for removing the IMD, based on the transmission power of the first signal in operation 1516.

In operation 1518, the electronic device may identify the maximum UL power of the second communication network by taking into consideration the set power class.

In operation 1520, the electronic device may determine the maximum power of the second signal to be transmitted via the second communication network, based on the identified maximum UL power.

In operation 1522, the electronic device may transmit the second signal to the second communication network, at the determined maximum power of the second signal.

Hereinafter, a detailed embodiment of the power control method described in FIG. 15 will be described.

For example, IMD that may be generable when LTE is allocated to a B3 band and 5G is allocated to n78 in the case of a combination of LTE and 5G ENDC, may be estimated. According to various embodiments, if a B3 uplink frequency band of an LTE transceiver and an n78 uplink frequency band of a 5G transceiver are as shown in Table 1, a noise component may be incurred in a B3 DL band due to a $2^{nd}$ order IMD between the two uplink signals.

TABLE 1

| LTE B3 UL frequency band | 5G n78 UL frequency band | $2^{nd}$ order IMD frequency band |
|---|---|---|
| 1735~1765 MHz | 3500~3600 MHz | 1835~1865 MHz |

Referring to Table 1, a noise component incurred by the $2^{nd}$ order IMD between two uplink signals may be present in the band ranging from 1835 to 1865 MHz, which may overlap an LTE B3 downlink frequency band in the range of 1830 to 1860 MHz.

For example, the magnitude of the $2^{nd}$ order IMD component may be expressed as given in Equation 1.

$$2^{nd} \text{ order IMD component magnitude} = \text{Log } A + \text{dBm (LTE } B3 \text{ power)} + \text{dBm(5G } n78 \text{ power)} \quad \text{Equation 1}$$

Log A may be expressed as given in Equation 2, based on Equation 1.

$$\text{Log } A = 2^{nd} \text{ order IMD component magnitude measured for UE} - \text{dBm(LTE } B3 \text{ power)} - \text{dBm (5G } n78 \text{ power)} \quad \text{Equation 2}$$

For example, if it is assumed that B3 TX power is 15 dBm and n78 TX power is 20 dBm, and the measured magnitude of the $2^{nd}$ order IMD component is -60 dBm, Log A=-60-15-20=-95.

According to an embodiment, the value of Log A may be obtained from Equation 2, by measuring some terminals when an electronic device is manufactured, and may be stored in a memory of the electronic device in the form of an NV parameter. According to various embodiments, if it is desired to maintain, within N dB, a decrease in sensitivity in the B3 reception band caused by the $2^{nd}$ order IMD component, the maximum power of the n78 UL signal may be determined based on Equation 3.

$$\text{dBm(5G } n78 \text{ maximum UL power\_IMD)} = B3 \text{ reception sensitivity} + N - \text{Log } A - \text{dBm(LTE } B3 \text{ UL power)} \quad \text{Equation 3}$$

According to various embodiments, if the maximum power is applied and the corresponding ENDC communication supports power class 3, the sum of LTE UL power and 5G UL power that exceeds 23 dBm may not be allowed. According to the condition, the n78 UL power may have another upper limit as given in Equation 4.

$$\text{dBm(5G } n78 \text{ maximum UL power\_}P\text{class)} = 23 - \text{dBm (LTE } B3 \text{ UL power)} \quad \text{Equation 4}$$

According to various embodiments, the n78 UL power may be set to the minimum value of the two upper limit conditions of Equation 3 and Equation 4, as given in Equation 5.

$$\text{dBm(5G } n78 \text{ maximum UL power)} = \text{Min(dBm(5G } n78 \text{ maximum UL power\_IMD)}, \text{dBm(5G } n78 \text{ maximum UL power\_}P\text{class))} \quad \text{Equation 5}$$

A power control method of an electronic device that supports dual connectivity according to any one of the various embodiments may include: transmitting at least a part of a first signal that is received from a first transceiver and corresponds to a first communication network, to a first antenna, by a first coupler electrically connected between the first antenna and the first transceiver; transmitting at least a part of a second signal that is received from a second transceiver and corresponds to a second communication network, to a second antenna, by a second coupler electrically connected between the second antenna and the second transceiver; receiving, by a second communication processor, a signal fed back from the first coupler; and controlling, by the second communication processor, a transmission power of the second signal, at least partially based on the signal fed back from the first coupler.

According to various embodiments, the method may include: determining, by the second communication processor, a transmission power of the first signal, based on the signal received via feedback from the first coupler; and determining, by the second communication processor, a transmission power of the second signal, based at least on the transmission power of the first signal and a maximum transmission power of the electronic device.

According to various embodiments, the method may further include: determining, by the second communication processor, resource block allocation information of the first signal, based on the signal received via feedback from the first coupler; and determining, by the second communication processor, a transmission power of the second signal, based at least on the resource block allocation information of the first signal.

According to various embodiments, the resource block allocation information of the first signal may include at least one of a number of the resource blocks allocated or location information associated with the resource blocks.

According to various embodiments, the number of the resource blocks allocated is determined based on a bandwidth of the first signal.

According to various embodiments, the method may further include: determining, by the second communication processor, a frequency band of the first signal, based on the resource block allocation information of the first signal; determining, by the second communication processor, a generable intermodulation distortion (IMD) interference signal, based on the determined frequency band of the first signal and a frequency band of the second signal; and determining a maximum transmission power of the second signal, based at least on the transmission power of the first signal and the generable IMD interference signal.

According to various embodiments, the method may include: converting, by the second transceiver, the signal received via feedback from the first signal into a baseband signal; transmitting the baseband signal obtained via conversion to the second communication processor; and determining, by the second communication processor, a transmission power of the second signal, based on the baseband signal.

According to various embodiments, the method may further include: determining, by the communication processor, the transmission power of the second signal, based at least on the transmission power of the first signal and a maximum transmission power of the electronic device.

Figure 16:
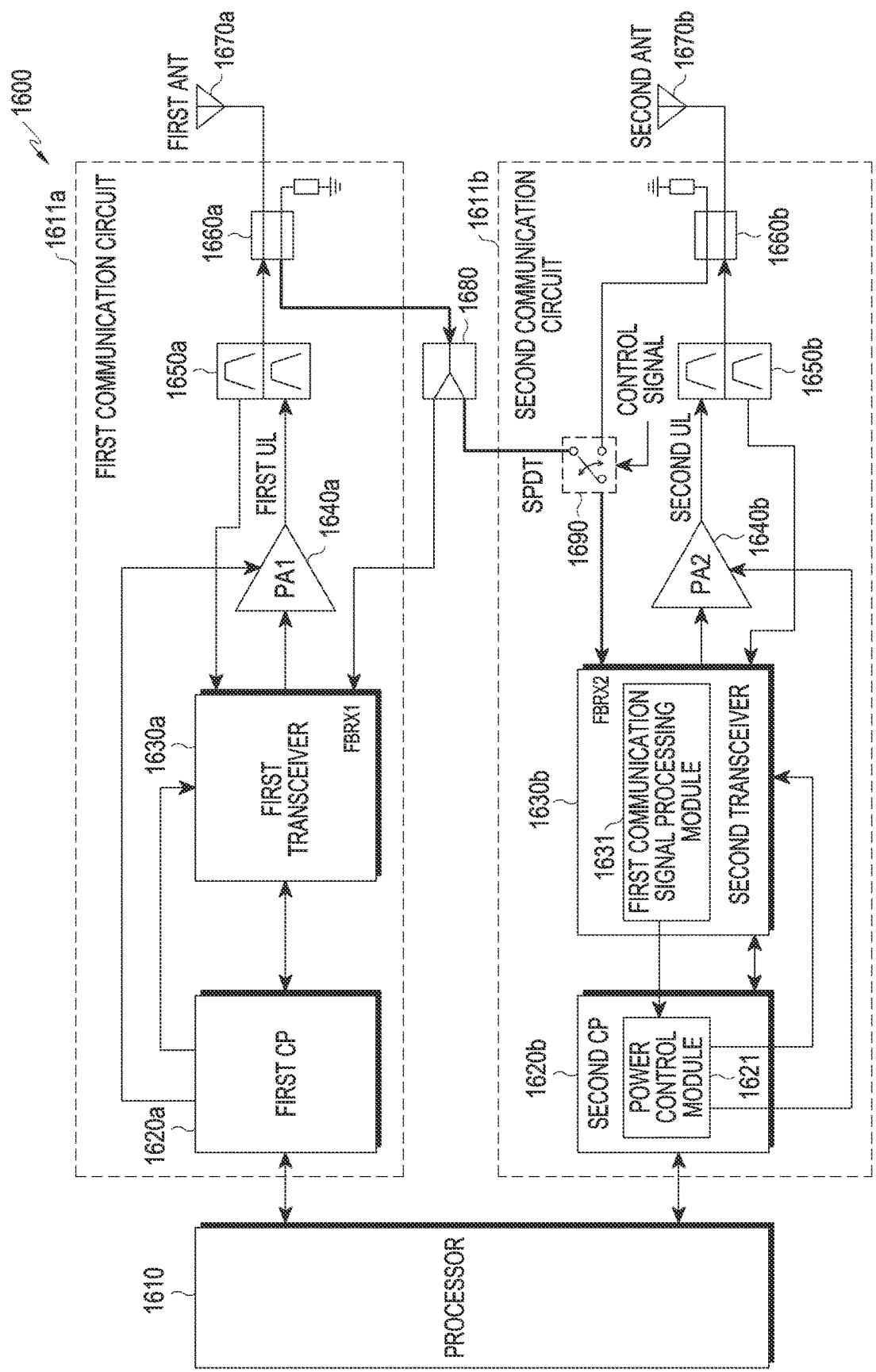
FIG. 16 is another block diagram of an electronic device that provides dual connectivity according to an embodiment of the disclosure.

FIG. 16 is another block diagram of an electronic device that provides dual connectivity according to an embodiment of the disclosure.

Referring to FIG. 16, an electronic device 1600 according to various embodiments may include at least one processor 1610 (e.g., an application processor), a first communication processor 1620a, a second communication processor 1620b, a first transceiver 1630a, a second transceiver 1630b, a first power amplifier 1640a, a second power amplifier 1640b, a first duplexer 1650a, a second duplexer 1650b, a first coupler 1660a, a second coupler 1660b, a first antenna 1670a, a second antenna 1670b, and/or a switch 1690 of a first communication circuit 1611a and a second communication circuit 1611b, coupled by a splitter 1680. Each component of the electronic device 1600 of FIG. 16 may perform an operation, which is the same as, or similar to, the operation performed by each corresponding component of the electronic device 500 of FIG. 5 or the electronic device 700 of FIG. 7.

The processor 1610 may include a controller (or a control circuitry) and/or a shared memory (e.g., a memory shared by the first communication processor 1620*a* and the second communication processor 1620*b*).

The first communication processor 1620*a* may establish a communication channel of a band to be used for wireless communication with a first communication network, and may support network communication via the established communication channel. According to various embodiments, the first network may include a 2G, 3G, 4G, or long-term evolution (LTE) network. According to various embodiments, a second communication network may be a 5G network defined in 3GPP.

According to an embodiment, the first communication processor 1620*a* may perform data transmission or reception with the second communication processor 1620*b*. For example, the first communication processor 1620*a* may perform data transmission or reception with the second communication processor 1620*b* via a UART or a PCIe interface. According to various embodiments, the first communication processor 1620*a* may perform, with the second communication processor 1620*b*, transmission or reception of at least one piece of information among activated band information, channel allocation information, communication state information (idle, sleep, active) associated with the state of communication with a network, sensing information, information associated with an output strength, or resource block (RB) allocation information.

According to an embodiment, the first communication processor 1620*a* may not be directly connected to the second communication processor 1620*b*. In this instance, the first communication processor 1620*a* may perform data transmission or reception with the second communication processor 1620*b*, via the processor 1610 (e.g., an application processor).

According to an embodiment, the first communication processor 1620*a* and the second communication processor 1620*b* may be implemented in a single chip or a single package. According to various embodiments, the first communication processor 1620*a* or the second communication processor 1620*b* may be implemented in a single chip or a single package, together with the processor 120, the sub-processor 123, or the communication module 190. For example, as illustrated in FIG. 2B, the integrated communication processor 260 may support both a function for communicating with the first communication network and a function for communicating with the second communication network.

According to various embodiments, the first transceiver 1630*a* may combine a PLL_1 signal and a signal transmitted from the first communication processor 1620*a* using a mixer, and may output a radio frequency (RF) signal which is appropriate for the frequency of the first communication network. The second transceiver 1630*b* may combine a PLL_2 signal and a signal transmitted from the second communication processor 1620*b* using a mixer, and may output a radio frequency (RF) signal which is appropriate for the frequency of the second communication network.

According to various embodiments, the first power amplifier 1640*a* may include an amplifier that is connected to the first transceiver 1630*a*, amplifies an RF signal, decreases distortion of an output signal, or maintains a high-efficiency characteristic. The second power amplifier 1640*b* may include an amplifier that is connected to the second transceiver 1630*b*, amplifies an RF signal, decreases distortion of an output signal, or maintains a high-efficiency characteristic.

According to various embodiments, the first duplexer 1650*a* may receive a first signal from the first power amplifier 1640*a* and may provide the first signal to the first antenna 1670*a*, and may receive a downlink signal received via the first antenna 1670*a* and may provide the downlink signal to the first transceiver 1630*a*. The second duplexer 1650*b* may receive a second signal from the second power amplifier 1640*b* and may provide the second signal to the second antenna 1670*b*, and may receive a downlink signal received via the second antenna 1670*b* and may transmit the downlink signal to the second transceiver 1630*b*.

According to various embodiments, the first power amplifier 1640*a* may amplify a first signal (TX1) received from the first transceiver 1630*a* to a designated gain according to the control of the first communication processor 1620*a*, and may transmit the same to the first antenna 1670*a* via the first coupler 1660*a*. The second power amplifier 1640*b* may amplify a second signal (TX2) received from the second transceiver 1630*b* to a designated gain according to the control of the second communication processor 1620*b*, and may provide the same to the second antenna 1670*b* via the second coupler 1660*b*. A power control module 1621 of the second communication processor 1620*b* may control the power of the second signal.

According to various embodiments, at least a part of the first signal transmitted via the first coupler 1660*a* may be fed back and transmitted to the splitter 1680. The signal transmitted to the splitter 1680 may be distributed and transmitted to the first transceiver 1630*a* and the switch 1690. According to various embodiments, at least a part of the signal distributed from the splitter 1680 may be input to the FBRX2 port of the second transceiver 1630*b* via the switch 1690.

According to various embodiments, the switch 1690 may perform switching according to a control signal from the first communication processor 1620*a*, the second communication processor 1620*b*, or the processor 1610, and may selectively receive a signal fed back by the first coupler 1660*a*, or a signal fed back by the second coupler 1660*b*.

The second transceiver 1630*b* may selectively monitor the transmission power of the first signal or the second signal, based on the signal fed back by the first coupler 1660*a* or the signal fed back by the second coupler 1660*b*, selected by the switch 1690.

Figure 17:
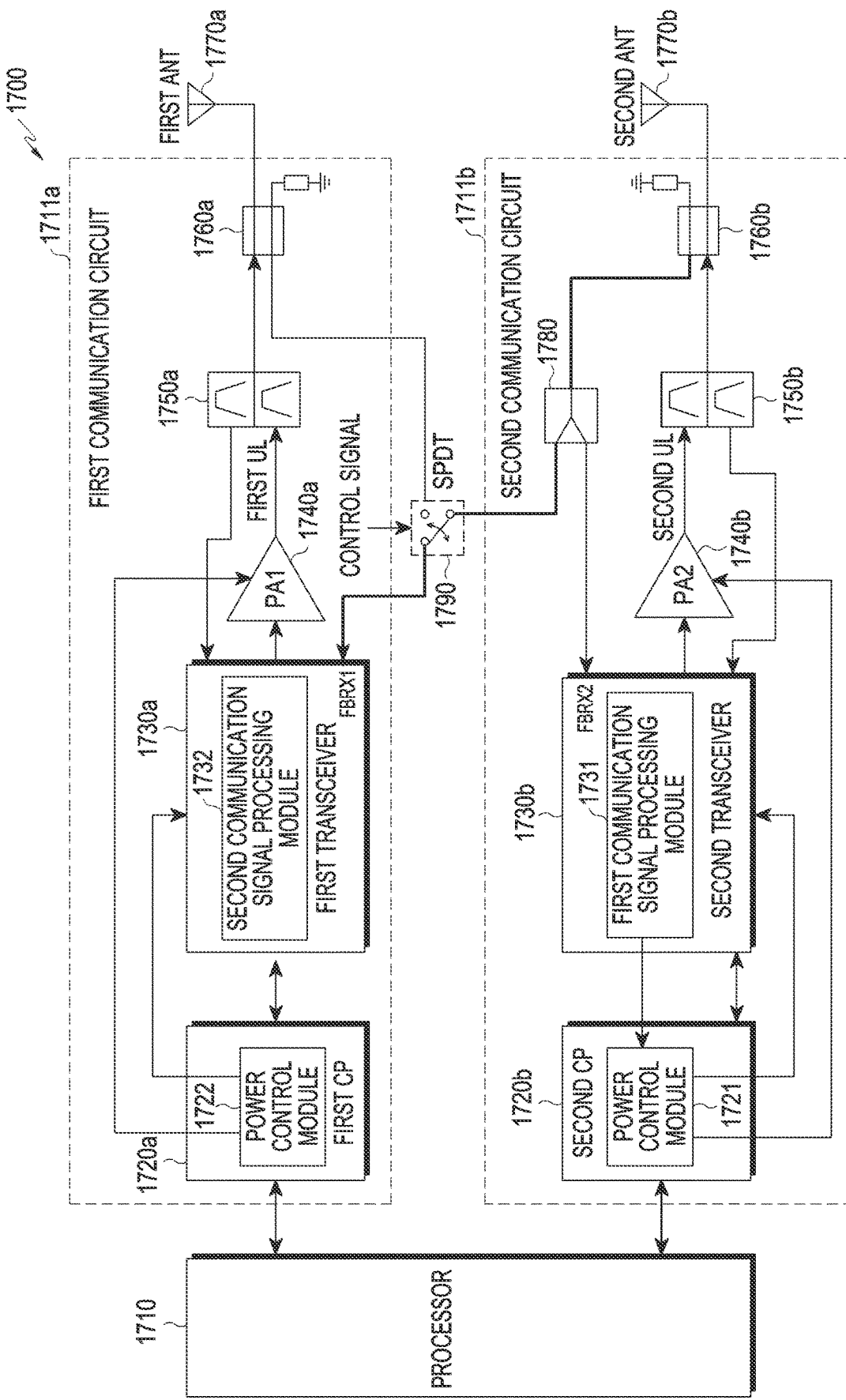
FIG. 17 is another block diagram of an electronic device that provides dual connectivity according to an embodiment of the disclosure.

FIG. 17 is another block diagram of an electronic device that provides dual connectivity according to an embodiment of the disclosure.

Referring to FIG. 17, an electronic device 1700 according to various embodiments may include at least one processor 1710 (e.g., an application processor), a first communication processor 1720*a*, a second communication processor 1720*b*, a first transceiver 1730*a*, a second transceiver 1730*b*, a first power amplifier 1740*a*, a second power amplifier 1740*b*, a first duplexer 1750*a*, a second duplexer 1750*b*, a first coupler 1760*a*, a second coupler 1760*b*, a first antenna 1770*a*, a second antenna 1770*b*, and/or a splitter 1780 of a first communication circuit 1711*a* and a second communication circuit 1711*b*, coupled by a switch 1790. Each component of the electronic device 1700 of FIG. 17 may perform an operation, which is the same as, or similar to, the operation performed by each corresponding component of the electronic device 700 of FIG. 7 or the electronic device 1600 of FIG. 16.

According to various embodiments, at least a part of the second signal transmitted via the second coupler 1760b may be fed back and transmitted to the splitter 1780. The signal transmitted to the splitter 1780 may be distributed and transmitted to the second transceiver 1730b and the switch 1790. According to various embodiments, at least a part of the signal distributed from the splitter 1780 may be input to the FBRX1 port of the first transceiver 1730a via the switch 1790.

According to various embodiments, the switch 1790 may perform switching according to a control signal from the first communication processor 1720a, the second communication processor 1720b, or the processor 1710, and may selectively receive a signal fed back by the first coupler 1760a, or a signal fed back by the second coupler 1760b.

The first transceiver 1730a may selectively monitor the transmission power of the first signal or the second signal, based on the signal fed back by the first coupler 1760a or the signal fed back by the second coupler 1760b, selected by the switch 1790. The first transceiver 1730a may convert the second signal fed back by the second coupler 1760b, into a baseband signal using a second communication signal processing module 1732, and may transmit the baseband signal obtained via conversion to the first communication processor 1720a. A power control module 1722 of the first communication processor 1720a may control the power of the first signal, based on the signal processed by the second communication signal processing module 1732.

The second transceiver 1730b may convert the first signal fed back by the first coupler 1760a, into a baseband signal using a first communication signal processing module 1731, and may transmit the baseband signal obtained via conversion to the second communication processor 1720b. A power control module 1721 of the second communication processor 1720b may control the power of the second signal, based on the signal processed by the first communication signal processing module 1731.

Figure 18:
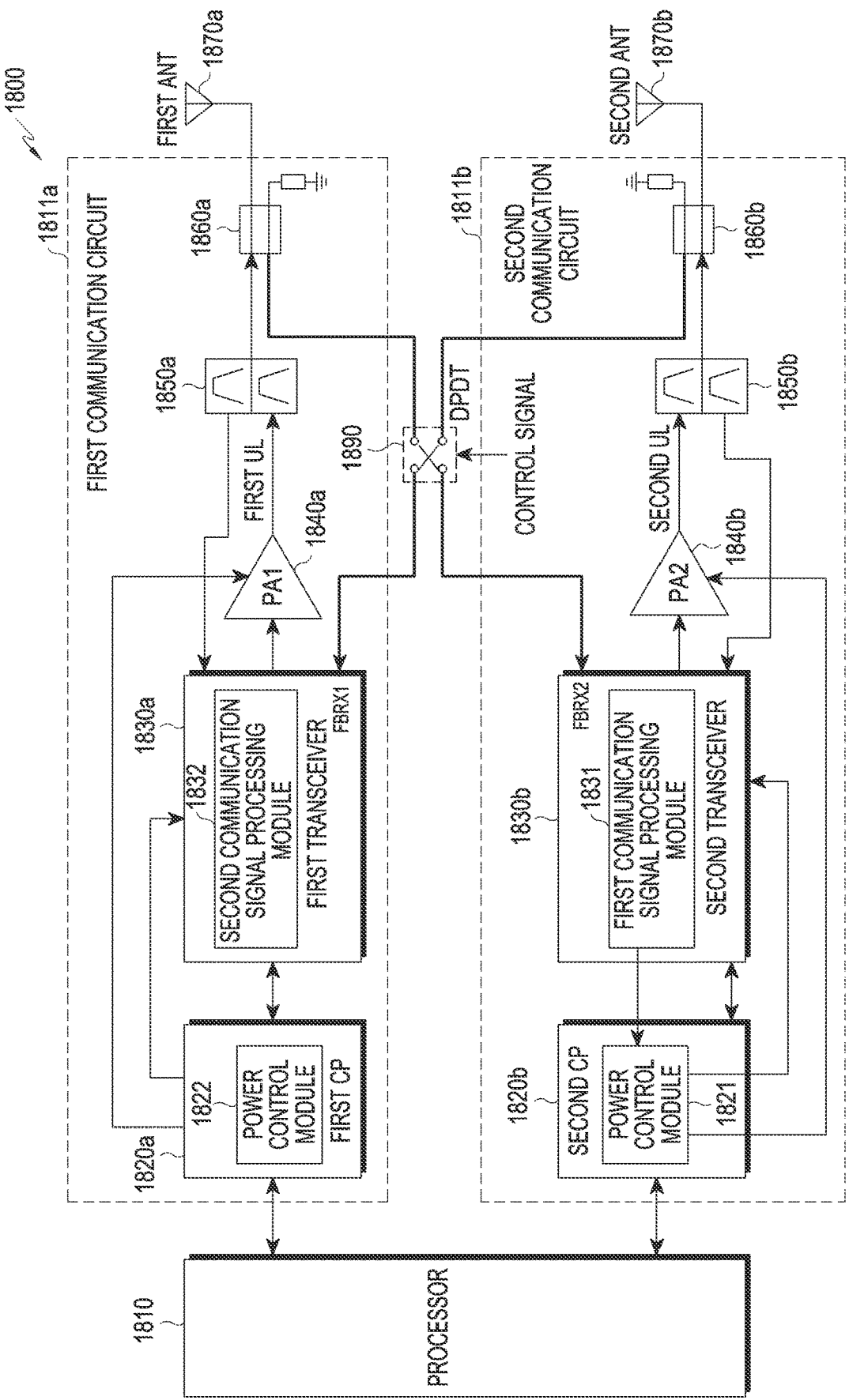
FIG. 18 is another block diagram of an electronic device that provides dual connectivity according to an embodiment of the disclosure.

FIG. 18 is another block diagram of an electronic device that provides dual connectivity according to an embodiment of the disclosure.

Referring to FIG. 18, an electronic device 1800 according to various embodiments may include at least one processor 1810 (e.g., an application processor), a first communication processor 1820a, a second communication processor 1820b, a first transceiver 1830a, a second transceiver 1830b, a first power amplifier 1840a, a second power amplifier 1840b, a first duplexer 1850a, a second duplexer 1850b, a first coupler 1860a, a second coupler 1860b, a first antenna 1870a, and/or a second antenna 1870b of a first communication circuit 1811a and a second communication circuit 1811b, coupled by a switch 1890. Each component of the electronic device 1800 of FIG. 18 may perform an operation, which is the same as, or similar to, the operation performed by each corresponding component of the electronic device 700 of FIG. 7 or the electronic device 1600 of FIG. 16.

According to various embodiments, at least a part of a first signal transmitted via the first coupler 1860a may be fed back and transmitted to the switch 1890, and at least a part of a second signal transmitted via the second coupler 1860b may be fed back and transmitted to the switch 1890.

According to various embodiments, the switch 1890 may input at least the part of the first signal fed back from the first coupler 1860a to the FBRX1 of the first transceiver 1830a, or to the FBRX2 of the second transceiver 1830b, according to a control signal. According to various embodiments, the switch 1890 may input at least the part of the second signal fed back from the second coupler 1860b to the FBRX1 of the first transceiver 1830a, or to the FBRX2 of the second transceiver 1830b, according to a control signal.

According to various embodiments, the switch 1890 may perform switching according to a control signal from the first communication processor 1820a, the second communication processor 1820b, or the processor 1810, may selectively receive the signal fed back via the first coupler 1860a or the signal fed back via the second coupler 1860b, and may input the received signal to the FBRX1 of the first transceiver 1830a or the FBRX2 of the second transceiver 1830b.

The first transceiver 1830a or the second transceiver 1830b may selectively monitor the transmission power of the first signal or the second signal, based on the signal fed back by the first coupler 1860a or the signal fed back by the second coupler 1860b, selected by the switch 1890.

The first transceiver 1830a may convert a second signal fed back by the second coupler 1860b, into a baseband signal using a second communication signal processing module 1832, and may transmit the baseband signal obtained via conversion to the first communication processor 1820a. A power control module 1822 of the first communication processor 1820a may control the power of the first signal, based on the signal processed by the second communication signal processing module 1832.

The second transceiver 1830b may convert a first signal fed back from the first coupler 1860a, into a baseband signal using a first communication signal processing module 1831, and may transmit the baseband signal obtained via conversion to the second communication processor 1820b. A power control module 1821 of the second communication processor 1820b may control the power of the second signal, based on the signal processed by the first communication signal processing module 1831.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and detail may be made therein without departing from the spirit and the scope of the disclosure as defined by the appended claims and their equivalents.

What is claimed is:

1. An electronic device, comprising:
   a housing;
   a plurality of antennas disposed inside the housing or disposed on at least a part of the housing;
   a first transceiver configured to:
      generate a first signal corresponding to a first communication network, and
      transmit the first signal to a first antenna from among the plurality of antennas;
   a second transceiver configured to:
      generate a second signal corresponding to a second communication network, and
      transmit the second signal to a second antenna from among the plurality of antennas;
   a first coupler electrically connected between the first antenna and the first transceiver;
   a splitter electrically connected to the first coupler, wherein the splitter is configured to distribute and transmit the signal received via feedback from the first coupler, to the first transceiver and the second transceiver; and
   a communication processor operatively connected to the first transceiver and to the second transceiver,
   wherein the communication processor is configured to control a transmission power of the second signal, at least partially based on the signal received by the splitter.

2. The electronic device of claim 1, wherein the communication processor is further configured to:
   determine a transmission power of the first signal, based on the signal received via feedback by the first coupler, and
   determine the transmission power of the second signal, based at least on the transmission power of the first signal and a maximum transmission power of the electronic device.

3. The electronic device of claim 1, wherein the communication processor is further configured to:
   determine resource block allocation information of the first signal, based on the signal received via feedback by the first coupler, and
   determine the transmission power of the second signal based at least on the resource block allocation information of the first signal.

4. The electronic device of claim 3, wherein the resource block allocation information of the first signal comprises:
   a number of the resource blocks allocated, or
   location information associated with the resource blocks.

5. The electronic device of claim 4, wherein the number of resource blocks allocated is determined based on a bandwidth of the first signal.

6. The electronic device of claim 3, wherein the communication processor is further configured to:
   determine a frequency band of the first signal based on the resource block allocation information of the first signal,
   determine a generable intermodulation distortion (IMD) interference signal based on the determined frequency band of the first signal and a frequency band of the second signal, and
   determine a maximum transmission power of the second signal based at least on the transmission power of the first signal and the generable IMD interference signal.

7. The electronic device of claim 1,
wherein the first antenna is disposed inside the housing or disposed on a first part of the housing, and
wherein the second antenna is disposed to be separate from the first part of the housing, and disposed inside the housing or on a second part of the housing.

8. The electronic device of claim 1, wherein the first communication network corresponds to a cellular network, and the second communication network corresponds to a short-range communication network.

9. The electronic device of claim 1, wherein the second transceiver is further configured to:
convert the signal transmitted via the splitter into a baseband signal, and
transmit the baseband signal obtained via conversion to the communication processor.

10. The electronic device of claim 1,
wherein the second transceiver comprises an envelope detector configured to:
detect an envelope of the signal received via feedback from the first coupler, and
output an analog signal, and
wherein the second transceiver is further configured to transmit the analog signal output via the envelope detector to the communication processor.

11. The electronic device of claim 10,
wherein the second transceiver further comprises a filter of which a center frequency varies according to a control signal of the communication processor, and
wherein the communication processor is further configured to determine location information of a resource block corresponding to the first signal based on the control signal and the analog signal transmitted from the second transceiver.

12. A power control method of a communication processor, the method comprising:
transmitting, to a first transceiver, a first signal, which corresponds to a first communication network, for transmitting the first signal to a first antenna, by a first coupler electrically connected between the first antenna and the first transceiver;
transmitting, to a second transceiver, a second signal, which corresponds to a second communication network, for transmitting the second signal to a second antenna, by a second coupler electrically connected between the second antenna and the second transceiver;
receiving, a signal received by a splitter, wherein the splitter receives a signal fed back from the first coupler; and
controlling a transmission power of the second signal, at least partially based on the signal received by the splitter.

13. The method of claim 12, further comprising:
determining a transmission power of the first signal based on the signal received via feedback from the first coupler; and
determining a transmission power of the second signal based at least on the transmission power of the first signal and a maximum transmission power of an electronic device.

14. The method of claim 12, further comprising:
determining resource block allocation information of the first signal based on the signal received via feedback from the first coupler; and
determining a transmission power of the second signal based at least on the resource block allocation information of the first signal.

15. The method of claim 14, wherein the resource block allocation information of the first signal comprises a number of the resource blocks allocated and location information associated with the resource blocks.

16. The method of claim 15, wherein the number of the resource blocks allocated is determined based on a bandwidth of the first signal.

17. The method of claim 14, further comprising:
determining a frequency band of the first signal based on the resource block allocation information of the first signal;
determining a generable intermodulation distortion (IMD) interference signal based on the determined frequency band of the first signal and a frequency band of the second signal; and
determining a maximum transmission power of the second signal based at least on the transmission power of the first signal and the generable IMD interference signal.

18. The method of claim 14, the method comprising:
receiving a baseband signal converted from the signal received via feedback from the first signal; and
determining a transmission power of the second signal based on the baseband signal.

19. The method of claim 18, further comprising:
determining the transmission power of the second signal based at least on the transmission power of the first signal and a maximum transmission power of an electronic device.

20. The method of claim 12, wherein the first communication network corresponds to a cellular network, and the second communication network corresponds to a short-range communication network.

* * * * *